United States Patent
Sundaresan et al.

(10) Patent No.: US 9,865,062 B2
(45) Date of Patent: Jan. 9, 2018

(54) SYSTEMS AND METHODS FOR DETERMINING A REGION IN AN IMAGE

(71) Applicant: QUALCOMM Incorporated, San Diego, CA (US)

(72) Inventors: Sairam Sundaresan, San Diego, CA (US); Dashan Gao, San Diego, CA (US); Xin Zhong, San Diego, CA (US); Lei Zhang, Shanghai (CN); Yingyong Qi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 97 days.

(21) Appl. No.: 15/042,782

(22) Filed: Feb. 12, 2016

(65) Prior Publication Data

US 2017/0236288 A1     Aug. 17, 2017

(51) Int. Cl.
| | |
|---|---|
| *G06K 9/00* | (2006.01) |
| *G06T 7/00* | (2017.01) |
| *G06T 7/20* | (2017.01) |
| *G06T 7/11* | (2017.01) |
| *G06T 7/215* | (2017.01) |

(52) U.S. Cl.
CPC .............. *G06T 7/0081* (2013.01); *G06T 7/11* (2017.01); *G06T 7/20* (2013.01); *G06T 7/215* (2017.01); *G06T 2207/10024* (2013.01); *G06T 2207/20101* (2013.01)

(58) Field of Classification Search
CPC .............. H04N 19/527; H04N 19/543; H04N 21/4728; H04N 5/144; H04N 5/145; G06T 7/215; G06T 2207/10016; G06T 7/20; G06K 9/3233
USPC .................................................. 382/173, 284
See application file for complete search history.

(56) References Cited

U.S. PATENT DOCUMENTS

| | | | |
|---|---|---|---|
| 8,861,864 B2 | 10/2014 | Hong et al. | |
| 9,329,827 B2 | 5/2016 | Lavine et al. | |
| 9,633,446 B2 * | 4/2017 | Wang | ...................... G06T 7/143 |
| 2002/0159636 A1 | 10/2002 | Lienhart et al. | |
| 2004/0017941 A1 | 1/2004 | Simske | |

(Continued)

FOREIGN PATENT DOCUMENTS

| | | |
|---|---|---|
| CN | 102682454 A | 9/2012 |
| CN | 103366359 A | 10/2013 |

(Continued)

OTHER PUBLICATIONS

Abou-Elailah "Fusion of Global and Local motion estimation using foreground objects for Distributed Video Coding", IEEE, pp. 973-987, 2015.*

(Continued)

*Primary Examiner* — Daniel Mariam
(74) *Attorney, Agent, or Firm* — Austin Rapp

(57) ABSTRACT

A method for determining a region of an image is described. The method includes presenting an image of a scene including one or more objects. The method also includes receiving an input selecting a single point on the image corresponding to a target object. The method further includes obtaining a motion mask based on the image. The motion mask indicates a local motion section and a global motion section of the image. The method further includes determining a region in the image based on the selected point and the motion mask.

28 Claims, 14 Drawing Sheets

(56) References Cited

U.S. PATENT DOCUMENTS

| | | | |
|---|---|---|---|
| 2007/0127774 | A1 | 6/2007 | Zhang et al. |
| 2007/0183661 | A1 | 8/2007 | El-Maleh et al. |
| 2011/0158558 | A1 | 6/2011 | Zhao et al. |
| 2011/0243443 | A1 | 10/2011 | Varekamp |
| 2012/0078899 | A1 | 3/2012 | Fontana et al. |
| 2013/0208947 | A1 | 8/2013 | Kang |
| 2014/0003686 | A1 | 1/2014 | Fontanarosa |
| 2014/0028842 | A1 | 1/2014 | Abramson et al. |
| 2014/0126821 | A1 | 5/2014 | Criminisi et al. |
| 2015/0222859 | A1 | 8/2015 | Schweid et al. |
| 2015/0334398 | A1 | 11/2015 | Socek et al. |
| 2016/0125249 | A1 | 5/2016 | Mei et al. |
| 2016/0328856 | A1 | 11/2016 | Mannino |
| 2017/0168709 | A1 | 6/2017 | Zhong et al. |

FOREIGN PATENT DOCUMENTS

| | | |
|---|---|---|
| WO | 2013144418 A1 | 10/2013 |
| WO | 2016029399 | 3/2016 |

OTHER PUBLICATIONS

Hamzaoui A., et al., "Object-Based Visual Query Suggestion," Multimed Tools Appl, 2014, vol. 68, pp. 429-454.

International Search Report and Written Opinion—PCT/CN2014/085381—ISA/EPO—dated Apr. 29, 2015.

Zitnick C.L., et al., "Edge Boxes: Locating Object Proposals from Edges," Computer Vision—ECCV 2014, Lecture Notes in Computer Science, 2014, vol. 8693, pp. 391-405.

Tinghuai W., et al., "TouchCut: Fast Image and Video Segmentation using Single-Touch Interaction," Computer Vision and Image Understanding, Nov. 12, 2013 (Nov. 12, 2013), vol. 120, pp. 14-30, XP028605679, ISSN: 1077-3142, DOI: 10.1016/J.CVIU.2013.10.013.

Heuer J., et al., "Global Motion Estimation in Image Sequences Using Robust Motion Vector Field Segmentation", Proceedings / ACM Multimedia 99 : [The 7th ACM International Multimedia Conference], Orlando, Florida, Oct. 30-Nov. 5, 1999, ACM, New York, NY, Oct. 30, 1999 (Oct. 30, 1999), XP058241041, pp. 261-264.

International Search Report and Written Opinion—PCT/US2016/063128—ISA/EPO—dated Apr. 3, 2017.

Liu F., et al., "Video Retargeting: Automating Pan and Scan", ACM Multimedia 2006 & Co-Located Workshops: Oct. 23-27, 2006, Santa Barbara, Califoirnia, USA, MM 06, Proceedings, ACM Press, [New York, NY], Oct. 23, 2006 (Oct. 23, 2006), XP002605061, pp. 241-250.

Trichet R., et al., "Fast Video Object Selection for Interactive Television", Proceedings / 2006 IEEE International Conference on Multimedia and Expo, ICME 2006: Jul. 9-12, 2006, Hilton, Toronto, Ontario, Canada, IEEE Service Center, Piscataway, NJ, Jul. 9, 2006 (Jul. 9, 2006), XP032964911, pp. 989-992.

* cited by examiner

US 9,865,062 B2

SYSTEMS AND METHODS FOR DETERMINING A REGION IN AN IMAGE

FIELD OF DISCLOSURE

The present disclosure relates generally to electronic devices. More specifically, the present disclosure relates to systems and methods for determining a region in an image.

BACKGROUND

Some electronic devices (e.g., cameras, video camcorders, digital cameras, cellular phones, smart phones, computers, televisions, automobiles, personal cameras, action cameras, surveillance cameras, mounted cameras, connected cameras, robots, drones, smart applications, healthcare equipment, set-top boxes, etc.) capture and/or utilize images. For example, a smartphone may capture and/or process still and/or video images. Processing images may demand a relatively large amount of time, memory and energy resources. The resources demanded may vary in accordance with the complexity of the processing.

It may be difficult to isolate objects in images. For example, it may be difficult to accurately separate an object in an image from other content (e.g., scenery) in the image. As can be observed from this discussion, systems and methods that improve image processing may be beneficial.

SUMMARY

A method for determining a region of an image is described. The method includes presenting an image of a scene including one or more objects. The method also includes receiving an input selecting a single point on the image corresponding to a target object. The method further includes obtaining a motion mask based on the image. The motion mask indicates a local motion section and a global motion section of the image. The method further includes determining a region in the image based on the selected point and the motion mask.

Determining the region may include generating a section map based on the selected point. The section map may include a target section corresponding to the selected point, a probable target section, a probable non-target section, and a non-target section. Determining the region may include combining the section map and the motion mask. The method may include segmenting the image based on the region to produce an object mask.

The method may include fusing motion information and color information. The method may include determining a non-target region in the image based on the selected point and the motion mask.

Obtaining the motion mask may include determining a set of local motion vectors within a region of interest between a previous frame and a current frame. Obtaining the motion mask may also include determining a set of global motion vectors between the previous frame and the current frame. Obtaining the motion mask may further include calculating a global motion consistency measure based on the set of global motion vectors.

The method may include tracking the target object based on the region. The region may correspond to the target object. The method may include generating a region of interest (ROI) based on the region. The method may include selecting the target object based on the region. The method may include presenting an indication of the target object.

An electronic device for determining a region of an image is also described. The electronic device includes a processor. The processor is configured to present an image of a scene including one or more objects. The processor is also configured to receive an input selecting a single point on the image corresponding to a target object. The processor is further configured to obtain a motion mask based on the image. The motion mask indicates a local motion section and a global motion section of the image. The processor is additionally configured to determine a region in the image based on the selected point and the motion mask.

An apparatus for determining a region of an image is also described. The apparatus includes means for presenting an image of a scene including one or more objects. The apparatus also includes means for receiving an input selecting a single point on the image corresponding to a target object. The apparatus further includes means for obtaining a motion mask based on the image. The motion mask indicates a local motion section and a global motion section of the image. The apparatus additionally includes means for determining a region in the image based on the selected point and the motion mask.

A computer-program product for determining a region of an image is also described. The computer-program product includes a non-transitory computer-readable medium with instructions. The instructions include code for causing an electronic device to present an image of a scene including one or more objects. The instructions also include code for causing the electronic device to receive an input selecting a single point on the image corresponding to a target object. The instructions further include code for causing the electronic device to obtain a motion mask based on the image. The motion mask indicates a local motion section and a global motion section of the image. The instructions additionally include code for causing the electronic device to determine a region in the image based on the selected point and the motion mask.

DETAILED DESCRIPTION

Figure 1:
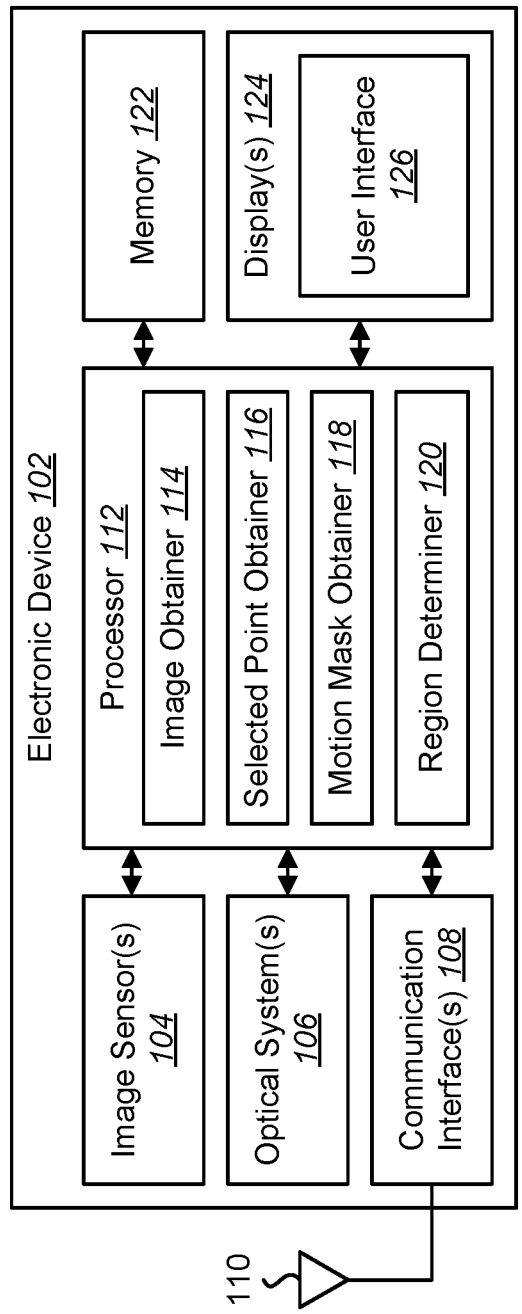
FIG. 1 is a block diagram illustrating one example of an electronic device in which systems and methods for determining a region of an image may be implemented.

The systems and methods disclosed herein may relate to determining a region of an image. For example, some configurations of the systems and methods disclosed herein may relate to region determination (e.g., automatic scribble generation) for interactive object segmentation and/or to one-touch object selection using a segmentation algorithm (e.g., motion-assisted segmentation).

In some approaches to image segmentation (e.g., some approaches for scribble-based foreground/background segmentation, selected area-based segmentation and/or "interactive image segmentation"), users may be required to provide a set of foreground and background scribbles in order to achieve an accurate segmentation. A "scribble" may be a set of multiple points, where the multiple points may be continuous (e.g., in a line or curve) or discontinuous. Manually providing these scribbles puts a big burden on the user, which makes applications using this technique less attractive, especially for mobile phone users. For example, it may be difficult for a user to provide an accurate scribble on a moving object in video. Accordingly, one challenging problem is to reduce (e.g., minimize) user input while maximizing the quality of the segmentation.

Additional or alternative difficulties may arise in the context of object selection and/or tracking. For example, problems may be apparent when an object tracker attempts to select an object in an image. The selection produced based on the user's input (e.g., touch) may be incomplete (e.g., the object tracker selects the object only partially). While some object trackers may consider color and motion, they may not fuse the information. Instead, they may choose between the two sources. Utilizing only motion or color may result in some limitations, such as only selecting a part of an object or selecting more than the object, which may lead to inaccuracies in algorithms that use the selection as input.

Object selection may be an important operation in several computer vision use cases (e.g., tracking, recognition, etc.), where the accuracy of the selection may significantly affect the accuracy and quality of the final result. A single selected point (e.g., single touch point, single mouse click point, single indicated pixel, etc.) may be one way to indicate a selection of an object of interest. A single selected point may be more accurate when selecting very small objects and/or moving objects. The systems and methods disclosed herein may enable accurate selection of an object of interest based on a single selected point (e.g., a single touch point from a user). Some configurations of the systems and methods disclosed herein accurately select an object of interest given a single selected point (e.g., touch input) from a user.

In some configurations of the systems and methods disclosed herein, automatic region generation (e.g., background and foreground region generation) for interactive object segmentation may be performed based on the location of a single selected point (e.g., a touch point) by exploiting local and global motion analysis. Instead of several scribbles to denote foreground and background, a single selected point (e.g., touch input) from the user may be utilized to automatically generate regions (e.g., scribbles, strokes, etc.) for segmentation. This may enable segmentation of moving objects based on a simple input (that is easily provided by a user, for example).

Some configurations of the systems and methods disclosed herein may utilize object characteristics (e.g., color, structure, etc.) as well as motion to accurately segment and/or select an object. Some examples of the systems and methods disclosed herein may combine (e.g., fuse) color and motion information in a segmentation framework (e.g., a scribble-based segmentation framework). The framework may take one or more object characteristics (e.g., color, structure, etc.) and motion into account to accurately segment and select the object. Some configurations of the systems and methods described herein may relax some constraints in a segmentation algorithm (e.g., scribble-based segmentation algorithm), which may achieve a significant increase in speed. Increases in segmentation speed may enable real-time performance.

Some configurations of the systems and methods disclosed herein may provide single selected point segmentation (e.g., one-touch segmentation), single selected point tracking (e.g., one-touch tracking), interactive image modification or manipulation (e.g., object removal, object cloning, etc.), object recognition, object detection, and/or automatic zoom, etc. The systems and methods disclosed herein may be implemented in a variety of devices and/or platforms. For example, the systems and methods disclosed herein may be implemented in mobile platforms (e.g., smart phones, cellular phones, tablet devices, laptops, digital cameras, wearable devices, drones, etc.), automotive platforms (e.g., vehicles, trucks, cars, etc.), robotics, and/or other platforms.

Some configurations of the systems and methods disclosed herein may reliably segment (e.g., improve the quality of segmentation) and/or select an object of interest. The systems and methods disclosed herein may be beneficial by providing fast operation (e.g., real-time performance). Some features of the systems and methods disclosed herein may include automatically determining regions (e.g., foreground and/or background regions) so that the only input from the user is a single selected point (e.g., touch point) that indicates the location of the target object (e.g., object of interest). Some configurations may be performed in real-time and/or may utilize motion estimation (from two or more consecutive frames) to generate regions (e.g., target and non-target regions, foreground and background regions, etc.) based on the single selected point (provided by a user touching the screen, for example). The single selected point approaches of the systems and methods disclosed herein may enable selection of moving objects, which may be difficult using scribble based approaches otherwise.

Some configurations of the systems and methods disclosed herein may utilize one or more segmentation algorithms. Some segmentation algorithms may utilize scribble-based segmentation. For example, scribble-based segmentation may be a robust technique that may be used in several applications. However, one limitation of scribble-based segmentation is that it may only consider a color space (e.g., a red, green, and blue (RGB) space) and not object motion. Scribble-based segmentation may also be computationally intensive.

The systems and methods disclosed herein may address one or more of these limitations. Some configurations of the systems and methods disclosed herein may modify scribble-based segmentation and/or may be implemented in conjunction with scribble-based segmentation in order to consider motion information and/or to reduce the computational load. For example, the systems and methods disclosed herein may provide an initial region of interest (ROI) (e.g., bounding box) estimate based on the location of a single selected point (e.g., touch location). Motion cues may be utilized to refine the initial (e.g., temporary) ROI estimate. Additionally or alternatively, a coarse mask may be recovered from scribble-based segmentation. Recovering a coarse mask may significantly speed up the algorithm. Accordingly, the systems and methods disclosed herein may provide single selected point (e.g., one-touch) object selection using scribble-based segmentations in some configurations. It should be noted that other segmentation approaches and/or algorithms besides scribble-based segmentation may be utilized in other configurations.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one example of an electronic device 102 in which systems and methods for determining a region of an image may be implemented. Examples of the electronic device 102 include cameras, video camcorders, digital cameras, cellular phones, smart phones, computers (e.g., desktop computers, laptop computers, etc.), tablet devices, media players, televisions, vehicles, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, aircraft, drones, unmanned aerial vehicles (UAVs), smart appliances, healthcare equipment, gaming consoles, personal digital assistants (PDAs), set-top boxes, appliances, etc. The electronic device 102 may include one or more components or elements. One or more of the components or elements may be implemented in hardware (e.g., circuitry) or a combination of hardware and software (e.g., a processor with instructions).

In some configurations, the electronic device 102 may perform one or more of the functions, procedures, methods, steps, etc., described in connection with one or more of FIGS. 1-14. Additionally or alternatively, the electronic device 102 may include one or more of the structures described in connection with one or more of FIGS. 1-14.

In some configurations, the electronic device 102 may include a processor 112, a memory 122, a display 124, one or more image sensors 104, one or more optical systems 106, and/or one or more communication interfaces 108. The processor 112 may be coupled to (e.g., in electronic communication with) the memory 122, display 124, image sensor(s) 104, optical system(s) 106, and/or communication interface(s) 108. It should be noted that one or more of the elements of the electronic device 102 described in connection with FIG. 1 (e.g., image sensor(s) 104, optical system(s) 106, communication interface(s) 108, display(s) 124, etc.) may be optional and/or may not be included (e.g., implemented) in the electronic device 102 in some configurations.

The processor 112 may be a general-purpose single- or multi-chip microprocessor (e.g., an ARM), a special-purpose microprocessor (e.g., a digital signal processor (DSP)), a microcontroller, a programmable gate array, etc. The processor 112 may be referred to as a central processing unit (CPU). Although just a single processor 112 is shown in the electronic device 102, in an alternative configuration, a combination of processors (e.g., an image signal processor (ISP) and an application processor, an ARM and a digital signal processor (DSP), etc.) could be used. The processor 112 may be configured to implement one or more of the methods disclosed herein. The processor 112 may include and/or implement an image obtainer 114, a selected point obtainer 116, a motion mask obtainer 118, and/or a region determiner 120 in some configurations.

The memory 122 may be any electronic component capable of storing electronic information. For example, the memory 122 may be implemented as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

The memory 122 may store instructions and/or data. The processor 112 may access (e.g., read from and/or write to) the memory 122. The instructions may be executable by the processor 112 to implement one or more of the methods described herein. Executing the instructions may involve the use of the data that is stored in the memory 122. When the processor 112 executes the instructions, various portions of the instructions may be loaded onto the processor 112 and/or various pieces of data may be loaded onto the processor 112. Examples of instructions and/or data that may be stored by the memory 122 may include image data, image obtainer 114 instructions, region determiner 120 instructions, selected point obtainer 116 instructions, and/or motion mask obtainer 118 instructions, etc.

The communication interface(s) 108 may enable the electronic device 102 to communicate with one or more other electronic devices. For example, the communication interface(s) 108 may provide one or more interfaces for wired and/or wireless communications. In some configurations, the communication interface(s) 108 may be coupled to one or more antennas 110 for transmitting and/or receiving radio frequency (RF) signals. Additionally or alternatively, the communication interface 108 may enable one or more kinds of wireline (e.g., Universal Serial Bus (USB), Ethernet, etc.) communication.

In some configurations, multiple communication interfaces 108 may be implemented and/or utilized. For example, one communication interface 108 may be a cellular (e.g., 3G, Long Term Evolution (LTE), CDMA, etc.) communication interface 108, another communication interface 108 may be an Ethernet interface, another communication interface 108 may be a universal serial bus (USB) interface, and yet another communication interface 108 may be a wireless local area network (WLAN) interface (e.g., Institute of Electrical and Electronics Engineers (IEEE) 802.11 interface). In some configurations, the communication interface 108 may send information (e.g., image information, region information, etc.) to and/or receive information from another device (e.g., a vehicle, a smart phone, a camera, a display, a remote server, etc.).

The electronic device 102 (e.g., image obtainer 114) may obtain one or more images (e.g., digital images, image frames, frames, video, etc.). For example, the electronic device 102 may include the image sensor(s) 104 and the optical system(s) 106 (e.g., lenses) that focus images of scene(s) and/or object(s) that are located within the field of view of the optical system 106 onto the image sensor 104. The optical system(s) 106 may be coupled to and/or controlled by the processor 112 in some configurations. A camera (e.g., a visual spectrum camera or otherwise) may include at least one image sensor and at least one optical system. Accordingly, the electronic device 102 may be one or more cameras and/or may include one or more cameras in some implementations. In some configurations, the image sensor(s) 104 may capture the one or more images (e.g., image frames, video, still images, burst mode images, etc.).

Additionally or alternatively, the electronic device 102 may request and/or receive the one or more images from another device (e.g., one or more external cameras coupled to the electronic device 102, a network server, traffic camera(s), drop camera(s), vehicle camera(s), web camera(s), etc.). In some configurations, the electronic device 102 may request and/or receive the one or more images via the communication interface 108. For example, the electronic device 102 may or may not include camera(s) (e.g., image sensor(s) 104 and/or optical system(s) 106) and may receive images from one or more remote device(s). One or more of the images (e.g., image frames) may include one or more scene(s) and/or one or more object(s).

In some configurations, the electronic device 102 may include an image data buffer (not shown). The image data buffer may be included in the memory 122 in some configurations. The image data buffer may buffer (e.g., store) image data from the image sensor(s) 104 and/or external camera(s). The buffered image data may be provided to the processor 112.

The display(s) 124 may be integrated into the electronic device 102 and/or may be coupled to the electronic device 102. Examples of the display(s) 124 include liquid crystal display (LCD) screens, light emitting display (LED) screens, organic light emitting display (OLED) screens, plasma screens, cathode ray tube (CRT) screens, etc. In some implementations, the electronic device 102 may be a smartphone with an integrated display. In another example, the electronic device 102 may be coupled to one or more remote displays 124 and/or to one or more remote devices that include one or more displays 124.

In some configurations, the electronic device 102 may include a camera software application. When the camera application is running, images of objects that are located within the field of view of the optical system(s) 106 may be captured by the image sensor(s) 104. The images that are being captured by the image sensor(s) 104 may be presented on the display 124. For example, one or more images may be sent to the display(s) 124 for viewing by a user. In some configurations, these images may be played back from the memory 122, which may include image data of an earlier captured scene. The one or more images obtained by the electronic device 102 may be one or more video frames and/or one or more still images. In some configurations, the display(s) 124 may present a full field of view of the image sensor(s) 104 and/or a zoom region. Additionally or alternatively, the display(s) 124 may present automatically focused images, one or more indicators corresponding to one or more objects of interest (e.g., ROIs) and/or one or more images (e.g., cropped object(s), zoomed object(s), etc.) resulting from one or more of the operations described herein.

In some configurations, the electronic device 102 may present a user interface 126 on the display 124. For example, the user interface 126 may enable a user to interact with the electronic device 102. In some configurations, the user interface 126 may enable a user to input a selected point. For example, the user interface 126 may receive a touch, a mouse click, a gesture and/or some other indication that indicates a selected point. In some configurations, the display 124 may be a touch display (e.g., a touchscreen display). For example, a touch display may detect the location of a touch input. The location of a touch input may indicate the selected point.

The electronic device 102 (e.g., processor 112) may optionally be coupled to, be part of (e.g., be integrated into), include and/or implement one or more kinds of devices. For example, the electronic device 102 may be implemented in a drone equipped with cameras. In another example, the electronic device 102 (e.g., processor 112) may be implemented in an action camera.

The processor 112 may include and/or implement an image obtainer 114. One or more images (e.g., image frames, video, burst shots, etc.) may be provided to the image obtainer 114. For example, the image obtainer 114 may obtain image frames from one or more image sensors 104. For instance, the image obtainer 114 may receive image data from one or more image sensors 104 and/or from one or more external cameras. As described above, the image(s) may be captured from the image sensor(s) 104 included in the electronic device 102 or may be captured from one or more remote camera(s).

In some configurations, the image obtainer 114 may request and/or receive one or more images (e.g., image frames, etc.). For example, the image obtainer 114 may request and/or receive one or more images from a remote device (e.g., external camera(s), remote server, remote electronic device, etc.) via the communication interface 108. The images obtained from the cameras may be processed by the processor 112 to perform region determination (e.g., target region determination) and/or object selection.

The processor 112 may include and/or implement a selected point obtainer 116. The selected point obtainer 116 may obtain (e.g., determine and/or receive) one or more selected points of an image. For example, one or more selected points may be provided to the selected point obtainer 116. In some configurations, a user interface 126 may receive an input (e.g., touch input, mouse click, gesture, etc.) that indicates (e.g., selects) a selected point. The selected point may be provided to the selected point obtainer 116. Additionally or alternatively, the selected point obtainer 116 may receive one or more selected points via the communication interface 108. For example, the electronic device 102 may include a device (e.g., an integrated device such as a touch screen, touch pad, button, etc.) and/or may be coupled to a remote device that may provide a selected point or information indicating a selected point. Examples of devices may include touchscreens (e.g., touchscreen monitors), mice, keyboards, digital pens, touch pads, cameras (e.g., camera for detecting gestures, such as depth sensors, time-of-flight (TOF) cameras, visual spectrum cameras, etc.), presentation remotes, laser pointers, videogame controllers, microphones (e.g., audio microphones for voice commands, ultrasonic microphones for digital pens, etc.), infrared receivers, smartphones, computers, tablets, servers, etc.

In some configurations, the selected point(s) may be provided directly by the user interface 126 and/or the remote device(s). In other configurations, the user interface 126 and/or remote device(s) may provide information (e.g., coordinates, sensed data, etc.) that indicate the selected point(s). For example, the selected point obtainer 116 may determine a selected point based on a click signal in conjunction with a current cursor location relative to an image being presented on the display(s) 124. In another example, the selected point obtainer 116 may determine a selected point based on a sensed touched area of a touch screen or touch pad (by selecting a pixel corresponding to a center location and/or average location of the touched area, for instance). In yet another example, the selected point obtainer 116 may determine a selected point based on image data (e.g., depth data, visual spectrum data, gesture data, etc.) from a camera (e.g., image sensor(s) 104 and/or camera(s) coupled to the communication interface 108). For instance, the selected point obtainer 116 may determine a selected point based on eye tracking data and gesture data (e.g., blink, etc.).

In some configurations, a selected point may indicate and/or correspond to a location on an image (e.g., in an image). For example, the selected point may indicate a pixel in an image. The selected point may correspond to an object in the image. For example, the selected point may be on an object (e.g., one of a set of object pixels) in the image.

The processor 112 may include and/or implement a motion mask obtainer 118. The motion mask obtainer 118 may obtain (e.g., determine and/or receive) a motion mask based on the image. The motion mask may include and/or indicate a local motion section and/or a global motion section of the image. The local motion section may include one or more areas of the image where local motion is detected. The global motion section may include one or more areas of the image where global motion occurs and/or one or more areas that are not local motion areas.

In some configurations, the motion mask obtainer 118 may receive the motion mask from a remote device (via the communication interface(s) 108, for example). For instance, the motion mask obtainer 118 may receive data from a remote device that indicates the motion mask (with a local motion section and a global motion section, for example).

Additionally or alternatively, the motion mask obtainer 118 may determine the motion mask. For example, the motion mask obtainer 118 may determine the motion mask based on two or more frames (e.g., a current frame and a previous frame) and/or the selected point. For instance, the motion mask obtainer 118 may generate an initial region of interest (ROI) based on the selected point. The initial ROI may have a predetermined shape and/or size (e.g., N×M pixels centered on the selected point, circle with a radius of R pixels from the selected point, etc.). In some configurations, the initial ROI may be relatively large (e.g., may be larger than a typical object size).

Motion may occur between images. For example, a scene may move between images and/or one or more objects may move between images captured at different time instances. This motion may result from the movement of the image sensor relative to the scene (and/or vice versa), and/or from the movement of one or more objects relative to the image sensor (and/or vice versa).

A motion vector may be a vector that indicates the motion (e.g., movement, displacement, shift, etc.) of a point or area between images. For example, the motion mask obtainer 118 may compare a previous frame and a current frame to determine the motion of one or more points (e.g., areas) of an image. The motion of the one or more points may come as a result of the motion of an image sensor 104 relative to its surroundings and/or as a result of the motion of an object relative to the image sensor 104. It should be noted that motion vectors may be computed in a forward sequence and/or in a backward sequence. For example, the motion mask obtainer 118 may generate a motion vector for a point starting at a first (e.g., previous) frame and progressing to a second (e.g., current) frame. Additionally or alternatively, the motion mask obtainer 118 may generate a motion vector for a point starting at the second (e.g., current) frame and progressing to a first (e.g., previous) frame.

The motion mask obtainer 118 may determine a set of local motion vectors (e.g., two or more local motion vectors). A local motion vector may be a motion vector corresponding to a point within a region of interest (e.g., bounding box). For example, the set of local motion vectors may include two or more local motion vectors within a region of interest between a previous frame and a current frame. In some configurations, the local motion vectors may correspond only to points (e.g., pixels) within a region of interest between frames. Thus, the local motion vectors may characterize the motion of one or more points within the region of interest. In some configurations, the local motion vectors may be computed using optical flow. It should be noted that the local motion pattern may not be based on feature points in some configurations.

The motion mask obtainer 118 may estimate global motion (e.g., perform global motion estimation) between frames. Global motion may be the motion of content (e.g., all content, background content or the content in general) between frames. Global motion information may be an indicator and/or estimate of global motion. In some configurations, determining global motion information may include computing one or more motion vectors between frames (with optical flow, for example). For instance, the global motion vectors may span a large portion of the frame. In some configurations, global motion vectors may cover a particular proportion of a frame. For example, the global motion vectors may span and/or consider 90% of the image (and may ignore borders, for instance). In some configurations, global motion vectors may be determined in a grid pattern over the image. The global motion may be determined based only on the input images in some approaches (without other input motion information, such as motion information from motion sensors like accelerometers and/or gyros, for example).

In some configurations, the motion mask obtainer 118 may additionally or alternatively estimate global motion based on other motion sensor data (besides image data, for example). For instance, the electronic device 102 may include one or more accelerometers, gyros, and/or other motion sensors. The motion data sensed by the motion sensor(s) may be provided to the motion mask obtainer 118. The motion mask obtainer 118 may determine global motion information (e.g., a global motion estimate) based on the motion data in some configurations. In some configurations, global motion information may be determined independent of mechanical control. For example, the global motion information may not be based on a mechanical control signal (e.g., a signal that controls mechanical actuators for moving a camera (e.g., pan and tilt)). For instance, estimating global motion may not be deterministic, where a motion control signal is known.

The motion mask obtainer 118 may determine a set of global motion vectors (e.g., two or more global motion vectors). A global motion vector may be a motion vector corresponding to a point in the image. A global motion vector may not be limited to points within the region of interest. For example, a global motion vector may or may not correspond to a point within the region of interest. The set of global motion vectors may be determined between a previous frame and a current frame. In some configurations, the set of global motion vectors may include at least one global motion vector that is outside of the region of interest.

The set of global motion vectors may characterize the general motion of one or more points in the image. In some configurations, the global motion vectors may be computed using optical flow.

In some configurations, the set of global motion vectors may span a larger area than the set of local motion vectors. Additionally or alternatively, the set of global motion vectors may include fewer motion vectors than the set of local motion vectors. For example, the set of global motion vectors may be less dense (e.g., include fewer motion vectors over a wider area) in comparison with the set of local motion vectors (which may include more motion vectors over a smaller area (e.g., the region of interest), for instance). Additionally or alternatively, the set of local motion vectors and the set of global motion vectors may be determined independently. For example, the global motion vectors may be calculated separately from the local motion vectors.

In some configurations, the motion mask obtainer 118 may preprocess the local motion vectors and/or the global motion vectors. For example, the motion mask obtainer 118 may reject one or more unreliable motion vectors (e.g., unreliable local motion vector(s), unreliable global motion vector(s), or both). In some approaches, the motion mask obtainer 118 may run a forward optical flow and a backward optical flow to obtain motion vectors. The motion mask obtainer 118 may measure a distance error between the (forward and backward generated) motion vectors. Those motion vectors that do not meet one or more criteria (e.g., that are in a percentile range, that have greater than a distance error threshold, etc.) may be rejected (e.g., discarded, removed from the motion vector set, not utilized in subsequent computation, etc.). An example of preprocessing the local motion vectors and/or the global motion vectors is given in connection with FIG. 5.

In some configurations, the motion mask obtainer 118 may check global motion consistency. For example, the processor 112 may determine a global motion consistency measure that indicates a degree to which the image is moving consistently. For instance, the global motion consistency measure may indicate how much of an image is (e.g., how many or what proportion of global motion vectors are) moving in a similar direction (e.g., within a range of directions). An example of calculating a global motion consistency measure is given in connection with FIG. 5. In some configurations, the motion mask obtainer 118 may determine whether the global motion consistency measure meets one or more consistency criteria (e.g., a motion consistency condition, a motion consistency amount, a motion consistency range, a motion consistency threshold, etc.). For example, the motion mask obtainer 118 may determine a motion mask differently based on whether the global motion consistency measure meets the one or more criteria.

In some approaches, the global motion consistency measure may be utilized to determine the motion mask. For example, the global motion consistency measure may be utilized to select a procedure for determining the motion mask (e.g., the local motion section and/or the global motion section). For example, the global motion consistency measure may be utilized to determine which pixels in the image are included in the local motion section and/or which pixels in the image are included in the global motion section. In the case that the global motion consistency measure meets the one or more criteria, for example, only pixels in the ROI corresponding to local motion vectors that are distinct enough from a global motion indicator (e.g., local motion vectors that are greater than a threshold difference from a global motion vector average) may be included in the local motion section. In particular, a separated motion mask (e.g., foreground separated motion mask) may be a motion mask where the local motion section includes only pixels corresponding to local motion vectors that are distinct enough from the global motion (e.g., global motion vector average, such as a mean or median). Additionally or alternatively, a separated motion mask may have a local motion section with a selection of pixels that meet one or more criteria (e.g., their motion vectors are significantly different from global motion vectors). The global motion section may include the remainder of the pixels. In cases where the global motion consistency measure does not meet the one or more criteria, all pixels in the ROI may be included in the local motion section (e.g., all pixels corresponding to original motion vectors in the ROI or corresponding to motion vectors in the ROI remaining after removing unreliable motion vectors, for example). In particular, an equi-weighted motion mask may be a motion mask where the local motion section may include all pixels in the ROI. The global motion section may include the remainder of the pixels. Additionally or alternatively, the local motion section in the equi-weighted motion mask may include all of the pixels in the ROI in the case that the global motion is inconsistent (e.g., the global motion consistency measure does not meet one or more criteria).

In some configurations, the motion mask obtainer 118 may include a separation metric calculator. Alternatively, the separation metric calculator may be separate from the motion mask obtainer 118. The separation metric calculator may calculate a separation metric based on the set of local motion vectors and the set of global motion vectors. The separation metric may be a measure of a degree of relative motion between the region of interest (e.g., an object) and the whole image. For example, the separation metric may indicate a motion difference between one or more local motion vectors and the global motion (e.g., a measure of the global motion and/or the set of global motion vectors). A more specific example for calculating a separation metric is given in connection with FIG. 5.

In some configurations, calculating the separation metric may include fitting the set of global motion vectors to a global motion model and calculating fitting errors between the global motion model and the set of local motion vectors. The global motion model may include at least one statistical measure of the set of global motion vectors. For example, the global motion model may be based on one or more statistical distribution measures (e.g., mean, median ($\lambda^G$), standard deviation ($\sigma^G$), etc.) of the global motion vectors. For instance, the separation metric may be based on one or more statistical distribution measures (e.g., mean, median, standard deviation, etc.) of the global motion vectors.

In some configurations, the motion mask obtainer 118 may calculate a weight map (e.g., foreground weight map) based on the separation metric. For example, the weight map may help separate the local motion vectors corresponding to a target object or object of interest (e.g., local motion section) from local motion vectors corresponding to non-target (e.g., background) content (e.g., global motion section). In some approaches, the motion mask obtainer 118 may smooth the foreground weight map over time. The foreground weight map may indicate weights corresponding to each local motion vector (in the region of interest, for example). Additionally or alternatively, the motion mask obtainer 118 may refine the weight map over space. For example, refining the weight map over space may include multiplying the weight map by a centrally weighted kernel.

In some configurations, the motion mask obtainer 118 may smooth a historical weight map over time.

The processor 112 may include and/or implement a region determiner 120. The region determiner 120 may determine a region (e.g., target region) in the image based on the selected point and the motion mask. The region (e.g., target region) may correspond to a target object or object of interest. For example, the region (e.g., target region) may include all or part of the target object or object of interest. Additionally or alternatively, the region determiner 120 may determine a non-target region (e.g., background region). In some configurations, the region may be an automatically generated scribble. For example, the systems and methods disclosed herein may automatically generate the region (e.g., scribble) as a substitute for a manually generated scribble.

It should be noted that the term "target" may denote and/or correspond to any object to be distinguished (e.g., selected) in a scene. For example, although an object may be in the "target" region, it may not necessarily be in the foreground and/or may not necessarily be the closest object to the camera. In some configurations, the region (e.g., target region) may refer to an area that includes (e.g., partially or completely includes) a target object or an object of interest. The term "non-target" may refer to an area that is not the region (e.g., target region). For example, a "non-target" region may include scenery and/or object(s) that are not in the region (e.g., target region). It should be noted that a non-target region may not necessarily be in the background of an image.

In order to determine the region (e.g., target region), the region determiner 120 may generate a section map based on the selected point. A section map may be a map that includes two or more sections and that corresponds to the image. An example of a section map is given in connection with FIG. 7. The section map may include a target section (e.g., foreground section). The target section may be determined based on the selected point. For example, the target section may include a set of pixels that includes the selected point. For instance, the target section may include pixels in a shape with particular dimensions (e.g., rectangle or square with a given height and width, a circle with a given radius, etc.) around the selected point.

In some configurations, the section map may include a probable target section. The probable target section may be determined based on the selected point and/or the target section. For example, the probable target section may include a set of pixels relative to the target section. For instance, the probable target section may include pixels in a shape with particular dimensions (e.g., rectangle or square with a given height and width, a circle with a given radius, etc.) around the target section. The probable target section may be adjacent to the target section (for section maps that include a probable target section, for example).

In some configurations, the section map may include a probable non-target (e.g., background) section. The probable non-target section may be an area that is not the target section (and/or not the probable target section). For example, the target section (and/or probable target section) may be surrounded by the probable non-target section. In some configurations, the probable non-target section may be a predetermined area (with a predetermined shape, location, and/or dimension(s)) that is not the target section (and/or not the probable target section). In other configurations, the probable non-target section (e.g., probable non-target section shape, location, and/or dimension(s)) may be determined based on the selected point. For example, the probable non-target section may include a set of pixels relative to the selected point. For instance, the probable non-target section may include pixels in a shape with particular dimensions (e.g., rectangle or square with a given height and width, a circle with a given radius, etc.) around the target section (and/or probable target section).

In some configurations, the section map may include a non-target section (e.g., background section). The non-target section may be an area that is not the target section (and/or not the probable target section and/or not the probable non-target section). For example, the target section (and/or probable target section and/or probable non-target section) may be surrounded by the non-target section. In some configurations, the non-target section may be a predetermined area (with a predetermined shape, location, and/or dimension(s)) that is not the target section (and/or not the probable target section and/or not the probable non-target section). In other configurations, the non-target section (e.g., background shape, location, and/or dimension(s)) may be determined based on the selected point. For example, the non-target section may include a set of pixels relative to the selected point. For instance, the non-target section may include pixels in a shape with particular dimensions (e.g., rectangle or square with a given height and width, a circle with a given radius, etc.) around the target section (and/or probable target section and/or probable non-target section). In some configurations, the section map may be a default scribble map or default stroke map. Utilizing the section map may avoid the need for providing a non-target (e.g., "background") scribble in some configurations (e.g., only the single selected point may be utilized).

The region determiner 120 may combine the section map and the motion mask in order to determine the region (e.g., target region, foreground region, etc.) and/or non-target (e.g., background) region. For example, the region determiner 120 may combine the target section and at least a portion of the local motion section to determine the region. In another example, the region determiner 120 may combine the target section, at least a portion of the probable target section and at least a portion of the local motion section to determine the region (e.g., target region). The region may correspond to (e.g., include) an object (e.g., a target object, an object of interest, a moving object, etc.). In some approaches, one or more portions of the local motion section may be excluded. For example, one or more portions of the local motion section corresponding to local motion vectors that are inconsistent with (e.g., that exhibit more than a threshold amount of difference in direction and/or magnitude from) some local motion vectors (e.g., an average of the set of local motion vectors or other characterization of the set of local motion vectors) may be excluded. In this way, only a portion (e.g., remaining portion) of the local motion section may be combined with the section map. In some configurations, combining the section map and the motion mask may produce a region map. An example of combining the section map and the motion mask is given in connection with FIG. 8.

In some configurations, the electronic device 102 may include an image segmenter. The region (e.g., the region map, target region and/or non-target region) may be provided to the image segmenter. The image segmenter may segment the image based on the region (e.g., target region) to produce an object mask. For example, some configurations of the image segmenter may segment the image based on color (and/or one or more other object characteristics such as luminance, gradients, etc.). In some configurations, the image segmenter may determine an object region of the image that has color(s) similar to color information of the region. The object mask may include an object region and a non-object region. The object region may indicate the location of an object of interest in the image. Some configurations of the image segmenter may be based on scribble-based segmentation. Other segmentation approaches may be utilized. One example of an object mask is provided in connection with FIG. 9.

Some configurations of the systems and methods disclosed herein may combine (e.g., fuse) color and motion information. For example, the electronic device 102 may determine a region (e.g., target region) based on motion information (e.g., motion vector(s), local motion vector(s), global motion vector(s), etc.) as described herein. In some configurations of the systems and methods disclosed herein, the motion and color information may be fused by utilizing the region (that is based on motion information) to perform image segmentation based on color. For example, the electronic device 102 may perform image segmentation based on the color(s) in the region (e.g., target region), where the region is determined based on motion information. For instance, the electronic device 102 may determine the object mask based on color information in a motion-based region (e.g., target region).

In some configurations, the image segmenter may obtain a coarse mask. For example, the image segmenter may obtain a coarse mask by relaxing constraints in the image segmenter. By not imposing several stringent conditions, for instance, a coarse (e.g., rough) mask may be obtained from the segmenter, which can be used for the purposes of generating an ROI. Obtaining a coarse mask may allow much faster and/or more efficient operation (than getting a typical mask). This in turn may allow handling moving objects more easily.

In some configurations, the electronic device 102 may select a target object based on the region (e.g., target region). For example, the electronic device 102 may flag and/or distinguish the target object based on the region. For instance, the target object included in the region may be selected for performing one or more operations (e.g., presentation on a display, tracking, zooming, cloning, removing, recognizing, etc.). Additionally or alternatively, the electronic device 102 may present an indication of the target object. For example, the electronic device 102 may emphasize (e.g., highlight, circle, outline, draw a bounding box on, color, enlarge, place an indicator on or nearby, etc.) the target object.

In some configurations, the electronic device 102 may generate a region of interest (ROI) (e.g., bounding box) based on the region (e.g., target region). For example, the electronic device 102 may generate an ROI that includes all or a portion of the region. In some approaches, the electronic device 102 may generate the ROI to tightly bound the object region (based on the image segmentation, for instance). In some configurations, the electronic device 102 may present the ROI on a display (e.g., show an outline of the ROI, highlight the ROI, color the ROI, show text on and/or near the ROI, show an icon on and/or near the ROI, etc.).

The region (e.g., target region), the object region, and/or an ROI (based on the region and/or object region) may be utilized to perform one or more operations in some configurations. For example, the electronic device 102 may perform object tracking, image modification (e.g., object removal, object cloning, etc.), object recognition, object detection, and/or automatic zoom based on the region, the object region, and/or the ROI. Utilizing the region (e.g., target region), the object region, and/or the ROI to perform one or more of these operations may significantly improve the performance (e.g., accuracy, speed, and/or efficiency) of the operation(s).

It should be noted that one or more of the elements or components of the electronic device 102 may be combined and/or divided. For example, the image obtainer 114, the region determiner 120, the selected point obtainer 116 and/or the motion mask obtainer 118 may be combined. Additionally or alternatively, one or more of the image obtainer 114, the region determiner 120, the selected point obtainer 116, and/or the motion mask obtainer 118 may be divided into elements or components that perform a subset of the operations thereof.

Figure 2:
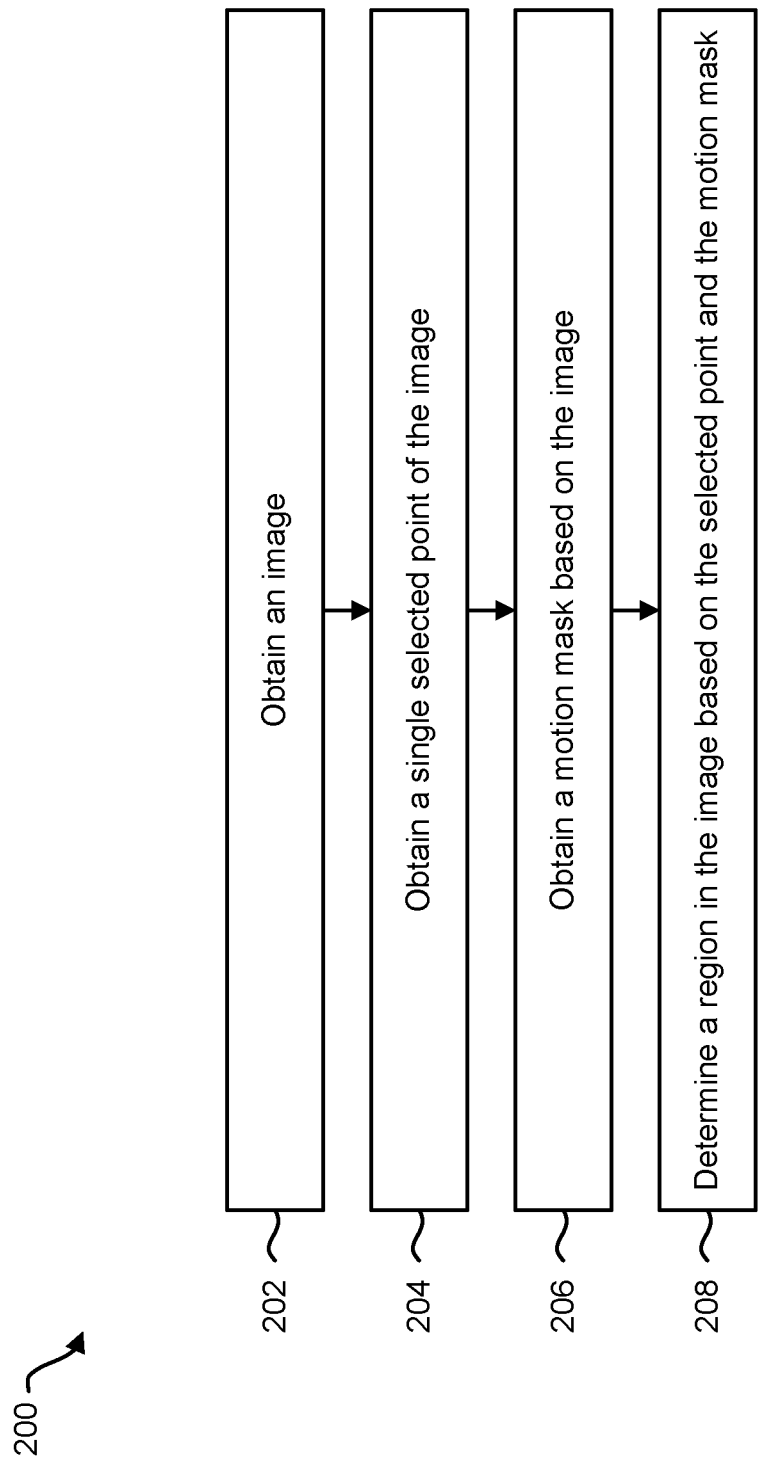
FIG. 2 is a flow diagram illustrating one configuration of a method for determining a region of an image.

FIG. 2 is a flow diagram illustrating one configuration of a method 200 for determining a region of an image. The method 200 may be performed by an electronic device (e.g., the electronic device 102 described in connection with FIG. 1).

The electronic device 102 may obtain 202 an image. This may be accomplished as described in connection with FIG. 1. For example, the electronic device 102 may capture one or more images with one or more image sensors 104 and/or may receive one or more images from one or more remote devices. The image(s) may include one or more scenes comprising one or more objects.

The electronic device 102 may optionally present one or more of the image(s). For example, the electronic device 102 may present the image(s) on display(s) and/or may provide the image(s) to one or more display(s) for presentation. This may allow a user to view the image(s).

The electronic device 102 may obtain 204 a single selected point of the image. This may be accomplished as described in connection with FIG. 1. For example, the electronic device 102 may determine and/or receive a single selected point of the image (e.g., receive an input selecting a single point on the image corresponding to a target object) based on information from a user interface 126 and/or one or more integrated and/or remote devices (e.g., touch screen, mouse, electronic pen, stylus, etc.).

The electronic device 102 may obtain 206 a motion mask based on the image. This may be accomplished as described in connection with FIG. 1. For example, the electronic device 102 may determine and/or receive a motion mask, where the motion mask indicates a local motion section and a global motion section. In some configurations, the electronic device 102 (and/or a remote device) may obtain a motion mask based on at least two images (e.g., may compare a current frame and a previous frame to determine the motion mask). For example, the electronic device 102 may determine a set of local motion vectors and a set of global motion vectors. The set of local motion vectors and/or the set of global motion vectors may be utilized to determine a target section of the motion mask and/or a non-target section of the motion mask.

The electronic device 102 may determine 208 a region (e.g., target region) in the image based on the selected point and the motion mask. This may be accomplished as described in connection with FIG. 1. For example, the electronic device 102 may generate a section map based on the selected point. The electronic device 102 may combine the section map and the motion mask to determine the region (e.g., target region) and/or a non-target region.

In some configurations, the electronic device 102 may segment the image based on the region (e.g., target region), which may produce an object mask. This may be accomplished as described in connection with FIG. 1. The electronic device 102 may additionally or alternatively perform one or more operations. For example, the electronic device 102 may generate an ROI, perform object tracking, perform image modification, perform object recognition, perform object detection, and/or perform automatic zoom, etc., in some configurations.

Figure 3:
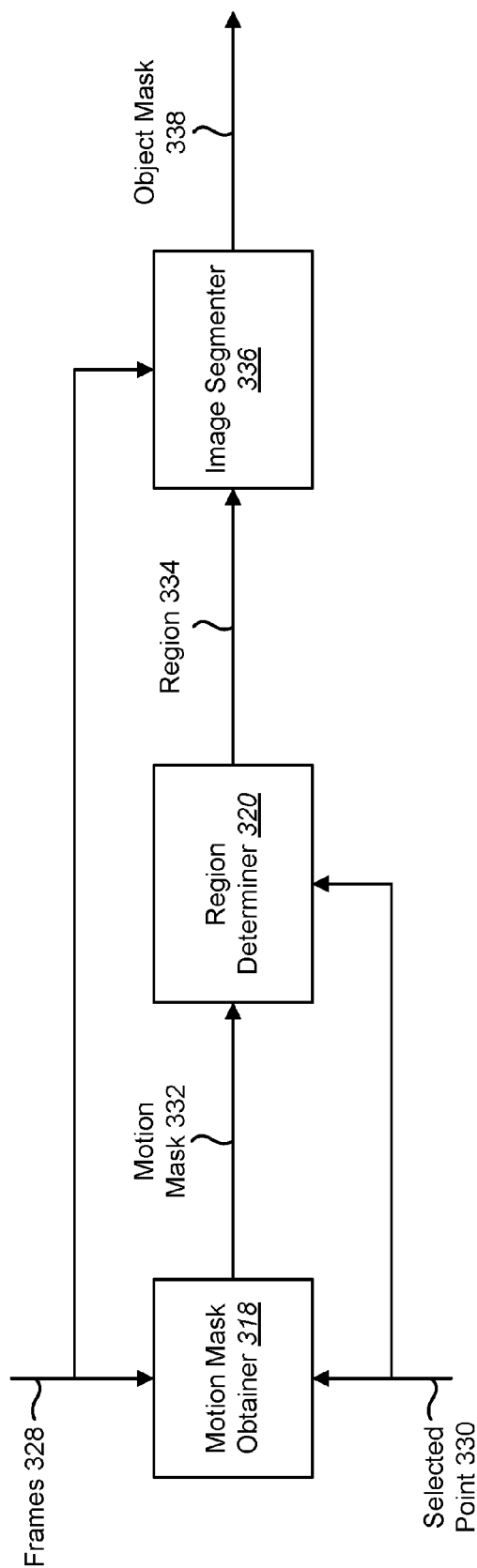
FIG. 3 illustrates an example of components for producing an object mask.

FIG. 3 illustrates an example of components (e.g., a pipeline) for producing an object mask 338. In particular, FIG. 3 illustrates a motion mask obtainer 318, a region determiner 320, and an image segmenter 336. The motion mask obtainer 318, the region determiner 320, and/or the image segmenter 336 may be examples of the motion mask obtainer 118, the region determiner 320, and/or the image segmenter described in connection with FIG. 1. One or more of the motion mask obtainer 318, the region determiner 320, and/or the image segmenter 336 may be implemented in hardware or a combination of hardware and software.

The motion mask obtainer 318 may obtain frames 328 (e.g., image frames, video frames, burst images, a series of images, etc.). For example, the motion mask obtainer 318 may obtain a current frame and a previous frame. In some configurations, the previous frame may immediately precede the current frame in a sequence. For example, the current frame may be consecutive to the previous frame. In other configurations, the previous frame may not immediately precede the current frame, but may precede the current frame by a number of frames (e.g., two frame, three frames, etc.). As described in connection with FIG. 3, the frames 328 (e.g., images, image frames, etc.) may be captured by the electronic device 102 and/or may be received from a remote device.

The motion mask obtainer 318 may obtain a selected point 330 (e.g., receive an input selecting a single point). The selected point 330 may be obtained as described in connection with FIG. 1. The selected point 330 may indicate a single point in an image (e.g., the current frame). In some configurations, the selected point 330 may be an address, a pixel location, a fractional pixel location, one or more index numbers (e.g., raster indices), a touch grid location, and/or another location indicator that relates to an image.

The motion mask obtainer 318 may determine the motion mask 332 based on the frames 328 and the selected point 330 as described in connection with FIG. 1. For example, the motion mask obtainer 318 may utilize the selected point 330 to generate an initial ROI (e.g., temporary ROI). The motion mask obtainer 318 may determine sets of motion vectors based on the initial ROI. For example, the motion mask obtainer 318 may determine the set of local motion vectors within the initial ROI. For instance, the motion mask obtainer 318 may select a set of points (e.g., pixels) within the initial ROI (for the previous and/or current frame, for example) for which the local motion vectors are determined. The motion mask obtainer 318 may also determine a set of global motion vectors that spans most of the image (regardless of the initial ROI, for example). The motion mask obtainer 318 may utilize the set of local motion vectors and/or the set of global motion vectors to determine the motion mask 332 as described in connection with FIG. 1. The motion mask 332 may be provided to the region determiner 320.

The region determiner 320 may determine a region 334 (e.g., target region) (and/or a non-target region) based on the motion mask 332 as described in connection with FIG. 1. For example, the region determiner 320 may generate a section map based on the selected point 330. The region determiner 320 may combine the motion mask 332 and the section map to determine the region 334. The region 334 (and/or the non-target region) may be provided to the image segmenter 336.

The image segmenter 336 may segment the image (e.g., the current image frame) based on the region 334 (e.g., target region). This may be accomplished as described in connection with FIG. 1. For example, the electronic device 102 may include the image segmenter 336 in some configurations. The image segmenter 336 may segment the image based on the region (e.g., target region, foreground region, etc.) to produce an object mask 338. The object mask 338 may include an object region and a non-object region. The object region may indicate the location of a target object or an object of interest in the image. Some configurations of the image segmenter may be based on scribble-based segmentation. Other segmentation approaches may be utilized.

Figure 4:
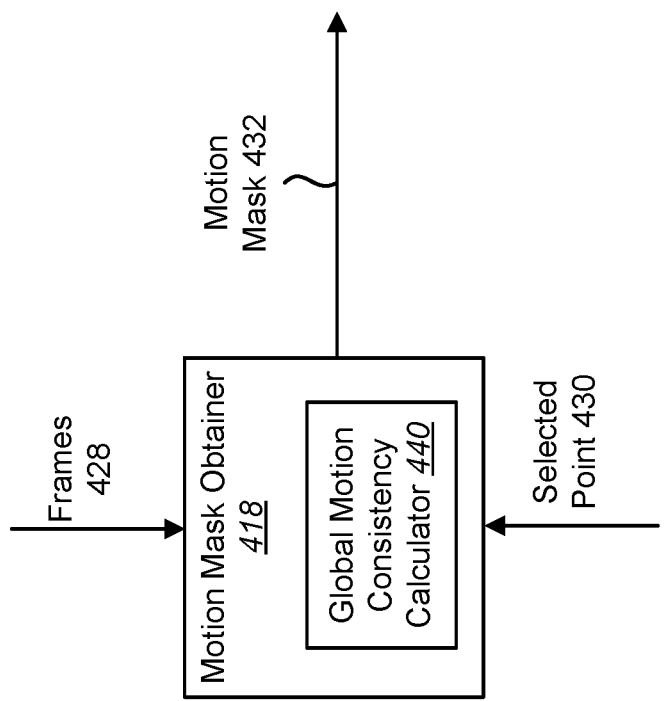
FIG. 4 illustrates a more specific example of a configuration of a motion mask obtainer.

FIG. 4 illustrates a more specific example of a configuration of a motion mask obtainer 418. The motion mask obtainer 418 may be an example of one or more of the motion mask obtainers 118, 318 described in connection with one or more of FIGS. 1 and 3. As described above, the motion mask obtainer 418 may determine a motion mask 432. For example, the motion mask obtainer 418 may generate an initial ROI based on the selected point 430. The motion mask obtainer 418 may utilize the initial ROI to determine a set of local motion vectors based on the frames 428 (e.g., between a previous frame and a current frame). The motion mask obtainer 418 may also determine a set of global motion vectors based on the frames 428 (e.g., between a previous frame and a current frame).

In this example, the motion mask obtainer 418 includes a global motion consistency calculator 440. The global motion consistency calculator 440 may calculate a global motion consistency measure based on the set of global motion vectors. The global motion consistency measure may indicate how much of an image is (e.g., how many or what proportion of global motion vectors are) moving in a similar direction (e.g., within a range of directions). The motion mask obtainer 418 may determine the motion mask 432 based on whether the global motion consistency measure meets one or more criteria. For example, if the global motion consistency measure does not meet a criterion, the motion mask obtainer 418 may generate an equi-weighted motion mask 432. If the global motion consistency measure meets the criterion, the motion mask obtainer 418 may generate a separated motion mask 432. Accordingly, the motion mask obtainer 418 may determine a motion mask 432 (e.g., a local motion section) in an image that identifies (e.g., includes) an object of interest (e.g., a moving object).

Figure 5:
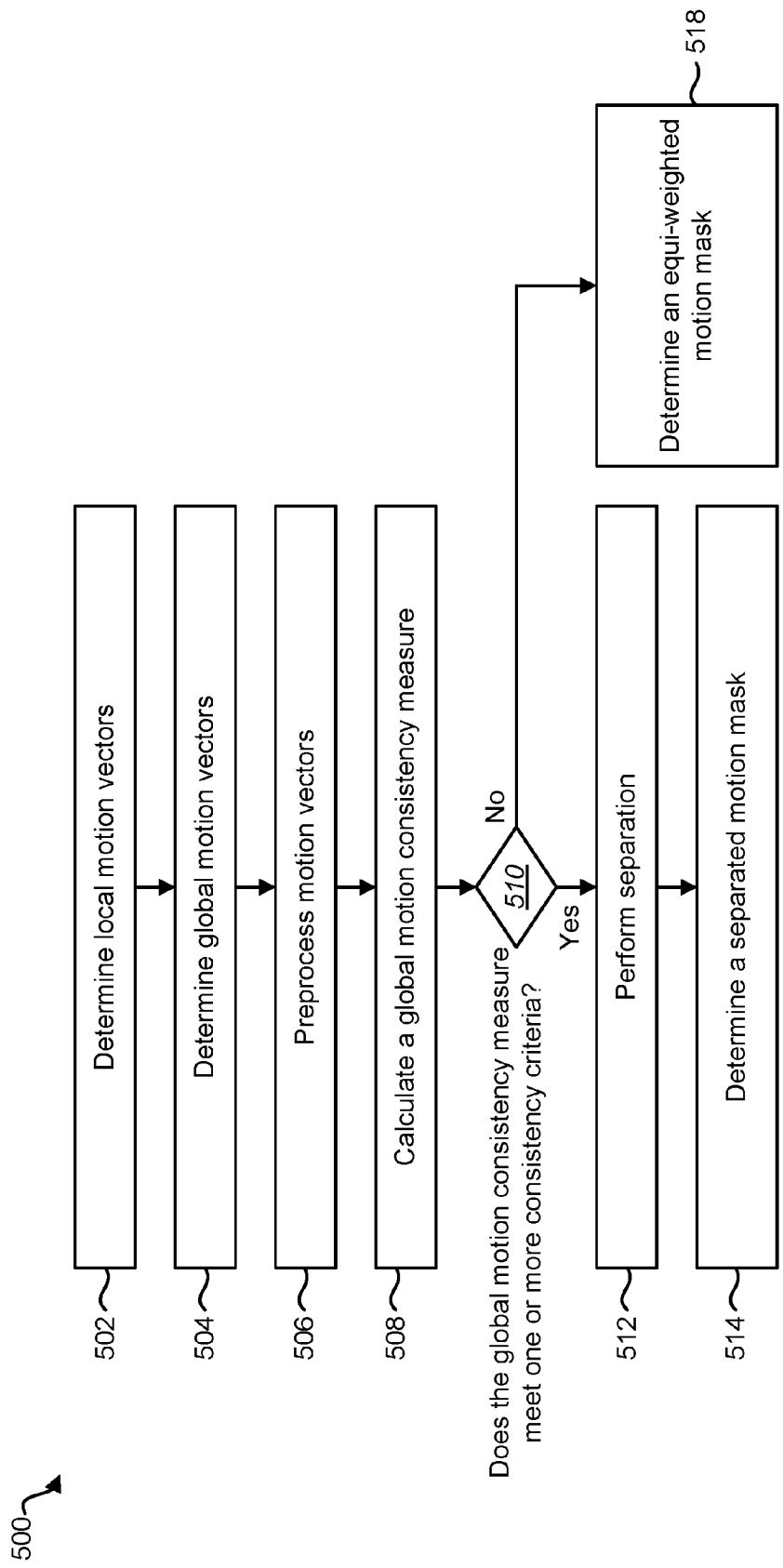
FIG. 5 is a flow diagram illustrating one configuration of a method for obtaining a motion mask.

FIG. 5 is a flow diagram illustrating one configuration of a method 500 for obtaining (e.g., determining) a motion mask. In some configurations, the electronic device 102 described in connection with FIG. 1 may perform the method 500. For example, the electronic device 102 described in connection with FIG. 1 may operate in accordance with one or more of the functions, steps, procedures and/or structures described in connection with FIG. 5. In some configurations, the method 500 may be an example of obtaining 206 a motion mask, as described in connection with FIG. 2.

Figure 6:
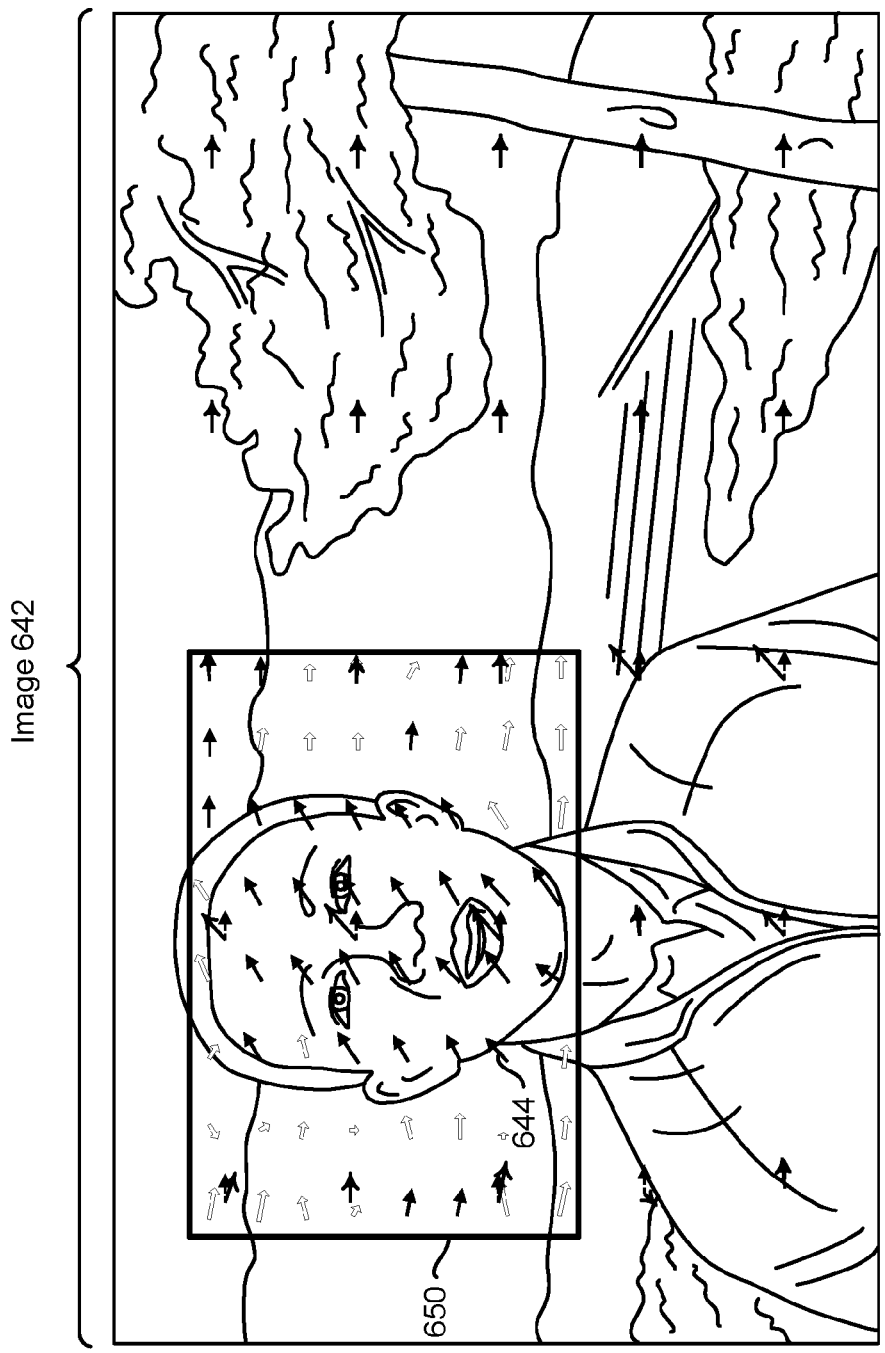
FIG. 6 is a diagram illustrating an example of an image, a set of global motion vectors, a region of interest and a set of local motion vectors.

An electronic device 102 may determine 502 a set of local motion vectors (e.g., calculate a set of local motion vectors). This may be accomplished as described above in connection with FIG. 1. For example, an electronic device 102 may calculate one or more local motion vectors within a region of interest between a previous frame and a current frame. In some configurations, determining 502 (e.g., calculating) the local motion vectors may be accomplished using optical flow. FIG. 6 illustrates examples of local motion vectors.

As described above, local motion vectors may be motion vectors that are within a region of interest. For example, the set of local motion vectors may be determined 502 within a region of interest between a previous frame and a current frame. In some configurations, the electronic device 102 may calculate local motion vector(s) with a forward trajectory and/or a backward trajectory.

The electronic device 102 may determine 504 global motion vectors (e.g., calculate a set of global motion vectors). This may be accomplished as described above in connection with FIG. 1. For example, an electronic device 102 may determine 504 (e.g., calculate) global motion vectors between a previous frame and a current frame. In some configurations, determining 504 (e.g., calculating) global motion vectors may be accomplished using optical flow. FIG. 6 illustrates examples of global motion vectors.

As described above, global motion vectors may be motion vectors that are distributed over a frame. For example, the set of global motion vectors may be determined 504 between a previous frame and a current frame. The set of global motion vectors may span a larger area than the local motion vectors. Additionally or alternatively, one or more of the global motion vectors may not be included in the region of interest (e.g., initial region of interest). It should be noted that one or more global motion vectors may be included within the region of interest.

The electronic device 102 may preprocess 506 motion vectors. For example, the electronic device 102 may preprocess 506 one or more local motion vectors and/or one or more global motion vector(s). Preprocessing 506 motion vectors may include determining and/or rejecting (e.g., discarding, removing, etc.) unreliable motion vectors. In some configurations, rejecting (e.g., discarding, removing, not utilizing, etc.) one or more unreliable motion vectors may include setting the one or more unreliable motion vectors to 0 and/or removing them from a set of motion vectors (e.g., from the set of local motion vectors).

As described above, a forward trajectory and a backward trajectory may be determined for one or more motion vectors (e.g., one or more local motion vectors and/or one or more global motion vectors). Preprocessing 506 the motion vectors may include measuring a distance error (e.g., a forward-backward error) between the forward trajectory and the backward trajectory. The distance error (e.g., forward-backward error) may be a distance between the forward trajectory and the backward trajectory. In some configurations, the electronic device 102 may determine the distance error as a Euclidean distance between the initial point of the forward trajectory and the end point of the backward trajectory. In some configurations, one or more of the motion vectors may be rejected based on the distance error. For example, a proportion of motion vectors (e.g., local motion vectors having a distance error in a percentile) may be rejected and/or one or more motion vectors with an amount of distance error (e.g., with a distance error above a threshold) may be rejected. For instance, local motion vectors having a distance error in the top 20th percentile may be rejected. It should be noted that other proportions may be utilized (e.g., 25th percentile, 50th percentile, etc.). Additionally or alternatively, motion vectors (e.g., local motion vectors) having a distance error below a percentile (e.g., below the $80^{th}$ percentile) may be kept. In some configurations, preprocessing may be performed as described in connection with FIG. 6.

The electronic device 102 may calculate 508 a global motion consistency measure. This may be accomplished as described above in connection with one or more of FIGS. 1 and 4. The global motion consistency may be a measure of how consistent motion is (between one or more images, for example) over the global motion vectors.

In some configurations, calculating 508 the global motion consistency may be performed in accordance with the following equations. Notation is provided here for convenience. Global motion vectors may be denoted $M^G = (m_{xi}^G, m_{yi}^G)$, where $m_{xi}^G$ is a horizontal motion component, $m_{yi}^G$ is a vertical motion component, and $i \in [0, N^G)$. $N^G$ denotes the total number of global motion vectors.

In some configurations, the electronic device 102 may determine one or more statistical measures of the global motion vectors. For example, the electronic device 102 may determine (e.g., calculate) one or more statistical distribution measures (e.g., average, mean, median, standard deviation, etc.) of the global motion vectors. A median of global motion may be denoted $\lambda^G = (\lambda_x^G, \lambda_y^G)$ where $\lambda_x^G$ is a median of the horizontal components of the global motion vectors and $\lambda_y^G$ is a median of the vertical components of the global motion vectors. Alternatively, a mean may be defined. A standard deviation of global motion may be denoted $\sigma^G = (\sigma_x^G, \sigma_y^G)$, where $\sigma_x^G$ is a standard deviation of the horizontal components of the global motion vectors and $\sigma_y^G$ is a standard deviation of the vertical components of the global motion vectors.

One approach to calculating 508 the global motion consistency measure may be given as follows. In this approach, the electronic device 102 may determine a number of global motion vectors that are within two standard deviations of the global median (or mean). For each motion vector pair $M^G$, for example, the electronic device 102 may calculate 508 the global motion consistency measure as $$\frac{\sum_{i=0}^{N^G} V_i}{N^G},$$

where $$V_i = \begin{cases} 1, & (M_i^G \geq \lambda^G - 2\sigma^G) \& (M_i^G \leq \lambda^G + 2\sigma^G) \\ 0, & \text{otherwise} \end{cases}.$$

The electronic device 102 may determine 510 whether the global motion consistency measure meets one or more consistency criteria. For example, the electronic device 102 may determine whether the global motion consistency measure is a consistency amount, is in a consistency range, and/or satisfies a consistency threshold. For instance, global motion consistency may be checked in accordance with the following equation:

$$\frac{\sum_{i=0}^{N^G} V_i}{N^G} \geq T,$$

where T is a consistency threshold. In some configurations, T may be 0.7 (determined experimentally, for example).

If the global motion consistency measure meets the one or more consistency criteria, the electronic device 102 may perform 512 separation. For example, if the global motion consistency measure (e.g., 14) is greater than or equal to a consistency threshold (e.g., T), the electronic device 102 may perform 512 separation.

In some configurations, performing 512 separation may include calculating a separation metric based on the local motion pattern and the global motion pattern. For example, local motion vectors may be denoted $M^L=(m_{xi}^L, m_{yi}^L)$, where $m_{xi}^L$ is a horizontal motion component, $m_{yi}^L$ is a vertical motion component, and $i \in [0, N^L)$. $N^L$ denotes the total number of local motion vectors. For example, $N^L$ may denote the total number of originally generated local motion vectors or a total number of local motion vectors remaining after preprocessing. For each motion vector pair $M^L$, the electronic device 102 may compute the separation metric as $$D^L = \text{abs}\left(\frac{M^L - \lambda^G}{2\sigma^G}\right)$$

in some configurations. For example, $D^L$ may indicate a motion difference between the set of local motion vectors and the set of global motion vectors (e.g., global motion model). For instance, the larger $D^L$ is, the more likely it is that the local motion vector corresponds to the target object (e.g., an object of interest that is moving different from the non-target content (e.g., background)). In this example, the global motion model may include the global motion vector median and the global motion vector standard deviation $\sigma^G$. Accordingly, the electronic device 102 may calculate the fitting errors (e.g., the separation metric $D^L$) between the global motion model and the local motion pattern (e.g., $M^L$).

In some configurations, the electronic device 102 may generate a weight map based on the separation metric. In some examples, the weight map may be generated by taking a maximum component of the separation metric (e.g., $D^L$), in either the horizontal (x) direction or vertical direction (y). For example, $W^L = \max(D_x^L, D_y^L)$. The weight map (e.g., $W^L$ or W) may be optionally smoothed over time to produce a temporally smoothed weight map (e.g., $W_t$). The weight map may be optionally refined over space to produce a spatially refined weight map (e.g., $W_s$). For example, the electronic device 102 may multiply the weight map by a centrally weighted kernel. In some configurations, the electronic device 102 may both temporally smooth and spatially refine the weight map to produce a smoothed refined weight map (e.g., W'). The electronic device 102 may optionally smooth a historical weight map (e.g., H) over time.

In some configurations, weighting the motion vectors (e.g., the local motion vectors) may include rejecting (e.g., removing, eliminating, de-selecting, etc.) one or more motion vectors (e.g., one or more local motion vectors after pre-processing). For example, one or more motion vectors may be weighted to 0. For instance, one or more local motion vectors that match the global motion vector median (or mean) may result in a zero weight (e.g., a separation metric of 0, which may result in a weight of 0). Additionally or alternatively, one or more local motion vectors that are within a separation distance amount (e.g., less than a separation distance threshold) from the global motion vector median (or mean) may be assigned a weight of 0. Accordingly, one or more motion vectors (e.g., local motion vectors) with non-zero (e.g., >0) weights may be selected motion vectors. One or more motion vectors (e.g., local motion vectors) with zero weights may be non-selected motion vectors.

The electronic device 102 may determine 514 a separated motion mask. This may be accomplished as described above in connection with FIG. 1. For example, only pixels in the ROI corresponding to remaining local motion vectors and/or corresponding to local motion vectors that are distinct enough from a global motion indicator (e.g., local motion vectors that are greater than a threshold difference from a global motion vector average) may be included in the local motion section. In particular, a separated motion mask may be a motion mask where the local motion section includes only pixels corresponding to local motion vectors that are distinct enough from the global motion (e.g., global motion vector average, such as a mean or median). The global motion section may include the remainder of the pixels. The separated motion mask (e.g., local motion section) may be utilized to determine a region map. The region map may be utilized to perform image segmentation in some configurations.

If the global motion consistency measure does not meet one or more consistency criteria, the electronic device 102 may determine 518 an equi-weighted motion mask. This may be accomplished as described above in connection with FIG. 1. For example, all pixels in the ROI may be included in the local motion section (e.g., all pixels corresponding to original motion vectors in the ROI or corresponding to motion vectors in the ROI remaining after removing unreliable motion vectors, for example). In particular, an equi-weighted motion mask may be a motion mask where the local motion section may include all pixels in the ROI. The global motion section may include the remainder of the pixels. The equi-weighted motion mask (e.g., local motion section) may be utilized to determine a region map. The region map may be utilized to perform image segmentation in some configurations.

FIG. 6 is a diagram illustrating an example of an image 642, a set of global motion vectors 648, a region of interest 650 (e.g., an initial region of interest) and a set of local motion vectors 644. Specifically, FIG. 6 illustrates a set of local motion vectors 644 inside of the region of interest 650 (e.g., bounding box). In this example, the set of local motion vectors includes 64 local motion vectors 644 (e.g., a grid of 8×8 local motion vectors within the region of interest 650). A set of global motion vectors 648 is also illustrated as spread over the frame. In this example, the set of global motion vectors includes 25 global motion vectors 648 (e.g., a grid of 5×5 global motion vectors 648).

As described above, an electronic device may determine a set of local motion vectors 644. In some configurations, determining the set of local motion vectors 644 may include computing one or more motion vectors (with optical flow, for example) within a region of interest 650. For example, the electronic device 102 may obtain a selected point in the image 642 (on the face of the person depicted in the image 642, for example). The electronic device 102 may generate the region of interest 650 (e.g., an initial region of interest). The electronic device 102 may then determine a set of local motion vectors 644 in the region of interest 650. In some configurations, calculating the local motion vectors may include determining forward and backward motion vectors (e.g., running forward and backward optical flow). For example, the electronic device 102 may determine forward and backward trajectories (as described above, for instance). In some configurations, preprocessing may include measuring a distance error and/or rejecting unreliable vectors based on the distance error (e.g., motion vectors in the 20th percentile). For example, FIG. 6 illustrates some rejected local motion vectors 644b, which may not be utilized (leaving the utilized local motion vectors 644a). For example, pixels corresponding to the utilized local motion vectors 644a (e.g., pixels at the points where the local motion vectors are measured and/or pixels in one or more ranges around the points where the local motion vectors are measured) may be included in the local motion section of the motion mask in some configurations. Additionally or alternatively, pixels corresponding to the rejected local motion vectors 644b (e.g., pixels at the points where the local motion vectors are measured and/or pixels in one or more ranges around the points where the local motion vectors are measured) may be excluded from the local motion section (and/or may be included in the global motion section) of the motion mask in some configurations.

As described above, an electronic device 102 may determine a set of global motion vectors. In some configurations, the electronic device 102 may compute one or more global motion vectors (with optical flow, for example). The global motion vectors 648 may span a larger area than the local motion vectors 644, for instance. In some configurations, global motion vectors may cover a particular proportion of an image. For example, the global motion vectors may span and/or consider 90% of the image (and may ignore borders, for instance). FIG. 6 illustrates global motion vectors 648 on a coarse 5×5 grid. FIG. 6 further illustrates a global motion vector median 646 (superimposed with each global motion vector 648). As illustrated in FIG. 6, a local motion section of a motion mask (e.g., a separated motion mask) may be determined based on utilized local motion vectors 644a.

Figure 7:
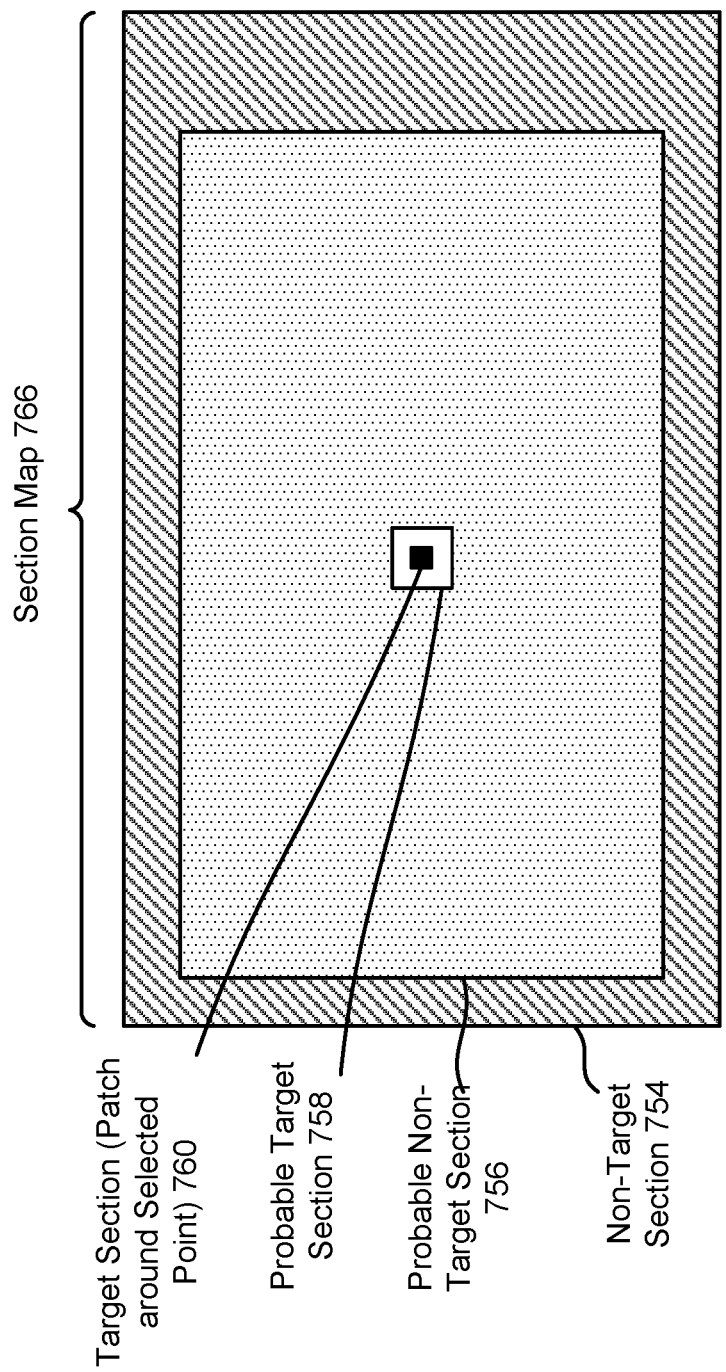
FIG. 7 illustrates one example of a section map.

FIG. 7 illustrates one example of a section map 766 (e.g., scribble map). The section map 766 described in connection with FIG. 7 may be an example of the section map described in connection with FIG. 1. In this example, the section map 766 includes four sections: a target section 760, a probable target section 758, a probable non-target section 756, and a non-target section 754. In some configurations and/or instances, the target section 760 may be a foreground section, the probable target section 758 may be a probable foreground section, the probable non-target section 756 may be a probable background section, and the non-target section 754 may be a background section. However, it should be noted that one or more of the sections 760, 758, 756, 754 may be located at different distances in some cases. For example, the target section 760 may correspond to an object in the "background" and/or may be further away than other objects in the scene. For instance, the target section 760 may correspond to a soccer player on a distant side of a field, while the probable non-target section 756 may include other soccer players that are nearer to the camera.

The section map 766 may be refined based on the motion mask. In some configurations, the section map 766 may be determined (e.g., generated, produced, etc.) by the region determiner 120 described in connection with FIG. 1.

The target section 760 may be determined based on the selected point. For example, the target section 760 may include a set of pixels (e.g., patch) that includes the selected point. In this example, the target section 760 includes pixels in a square with a given height and width around the selected point.

The probable target section 758 may be determined based on the selected point and/or the target section 760. In this example, the probable target section 758 includes a set of pixels relative to the target section 760. For instance, the probable target section 758 includes pixels in a square with a given height and width around the target section 760.

The probable non-target section 756 may be an area that is not the target section 760 and not the probable target section 758. In this example, the probable target section 758 is surrounded by the probable non-target section 756. Furthermore, the probable non-target section 756 is determined based on the selected point in this example. Specifically, the probable non-target section 756 includes a set of pixels relative to the selected point in a rectangle with a given height and width around the probable target section 758.

The non-target section 754 may be an area that is not the target section 760, not the probable target section 758, and not the probable non-target section 756. In this example, the probable non-target section 756 is surrounded by the non-target section 754. For instance, the non-target section 754 includes the remaining area of the section map (e.g., image) that is no other section. It should be noted that in some cases, a section may partially surround another section. For example, if the target section 760 is near the left edge of the image, then the non-target section 754 may only surround the probable non-target section 756 on three sides.

Figure 8:
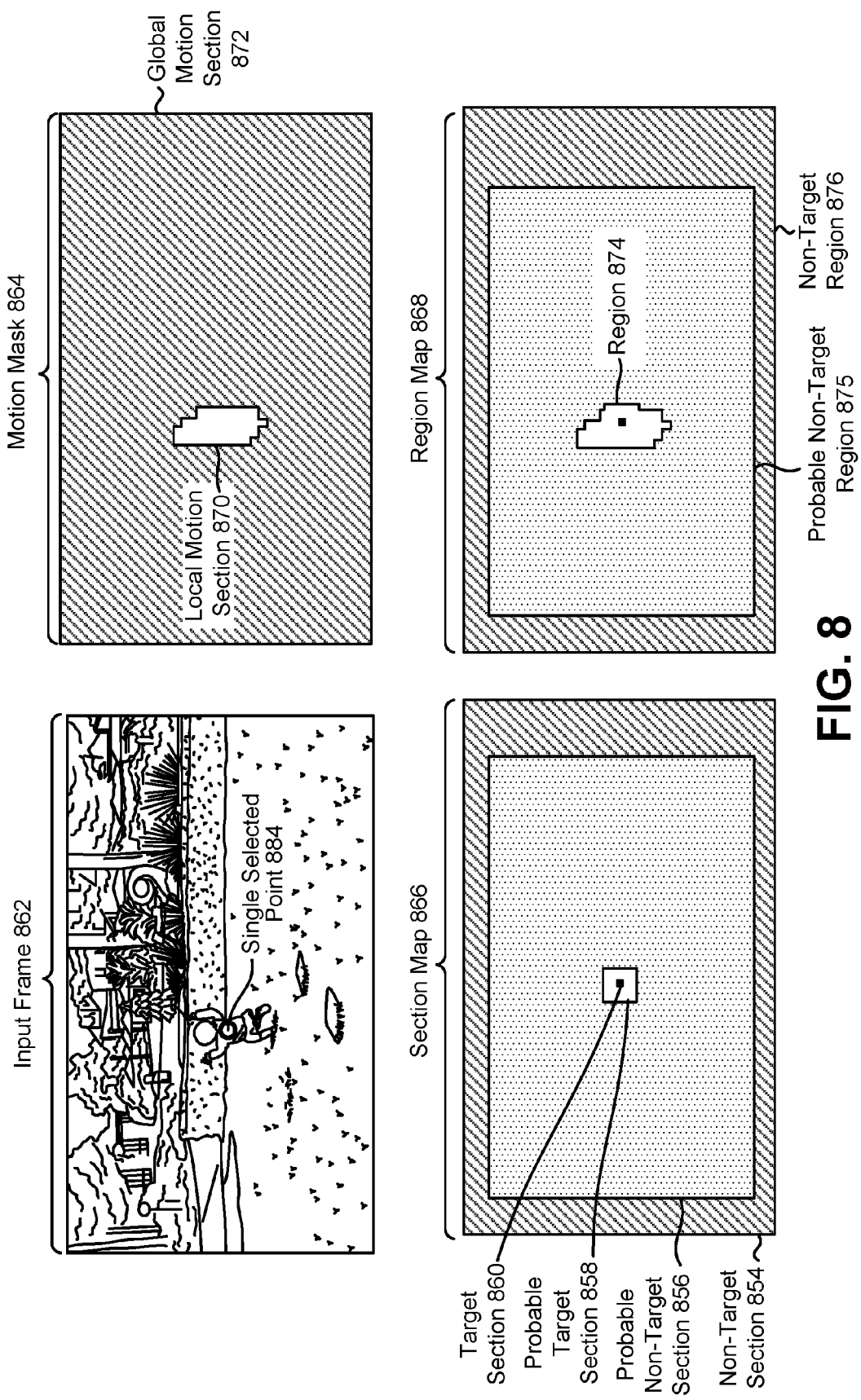
FIG. 8 illustrates an example of region map generation.

FIG. 8 illustrates an example of region map 868 generation. For example, FIG. 8 illustrates an example of an input frame 862, a motion mask 864, a section map 866, and a region map 868. Generation of the region map 868 (e.g., modified motion mask, modified section map, modified scribble map, etc.) may be assisted by motion information (e.g., the motion mask 864).

The input frame 862 is an example of an image that may be obtained by an electronic device 102. As described above, the electronic device 102 may obtain a single selected point 884 (e.g., a touch point, a cursor location with a mouse click, etc.). In this example, the single selected point 884 corresponds to a moving object (a child). The electronic device 102 may determine the motion mask 864 based on the single selected point 884 and the input frame 862 (and a previous frame, for example) as described above in some configurations.

The motion mask 864 (e.g., a separated motion mask) may include a local motion section 870 and a global motion section 872. For example, the local motion section 870 may include a set of pixels corresponding to utilized local motion vectors as described in connection with FIG. 6. The global motion section 872 may include the remainder of the pixels.

The electronic device 102 may obtain (e.g., generate, determine, etc.) the section map 866 as described above. For example, the section map 866 may include a target section 860 corresponding to the single selected point 884, a probable target section 858, a probable non-target section 856, and a non-target section 854.

The electronic device 102 may obtain the region map 868 based on the motion mask 864 and the section map 866. For example, the electronic device 102 may combine the local motion section 870 of the motion mask 864 with the target section 860 and probable target section 858 to produce the region 874 (e.g., target region). In some configurations, the probable non-target section 856, the non-target section 854, and the global motion section 872 may be combined to produce the non-target region 876 (e.g., background region). In other configurations, multiple types of non-target regions may be produced. For example, the remainder of the probable non-target section 856 (that is not the region 874) may be a probable non-target region 875, while the non-target section 854 may become the non-target region 876.

Figure 9:
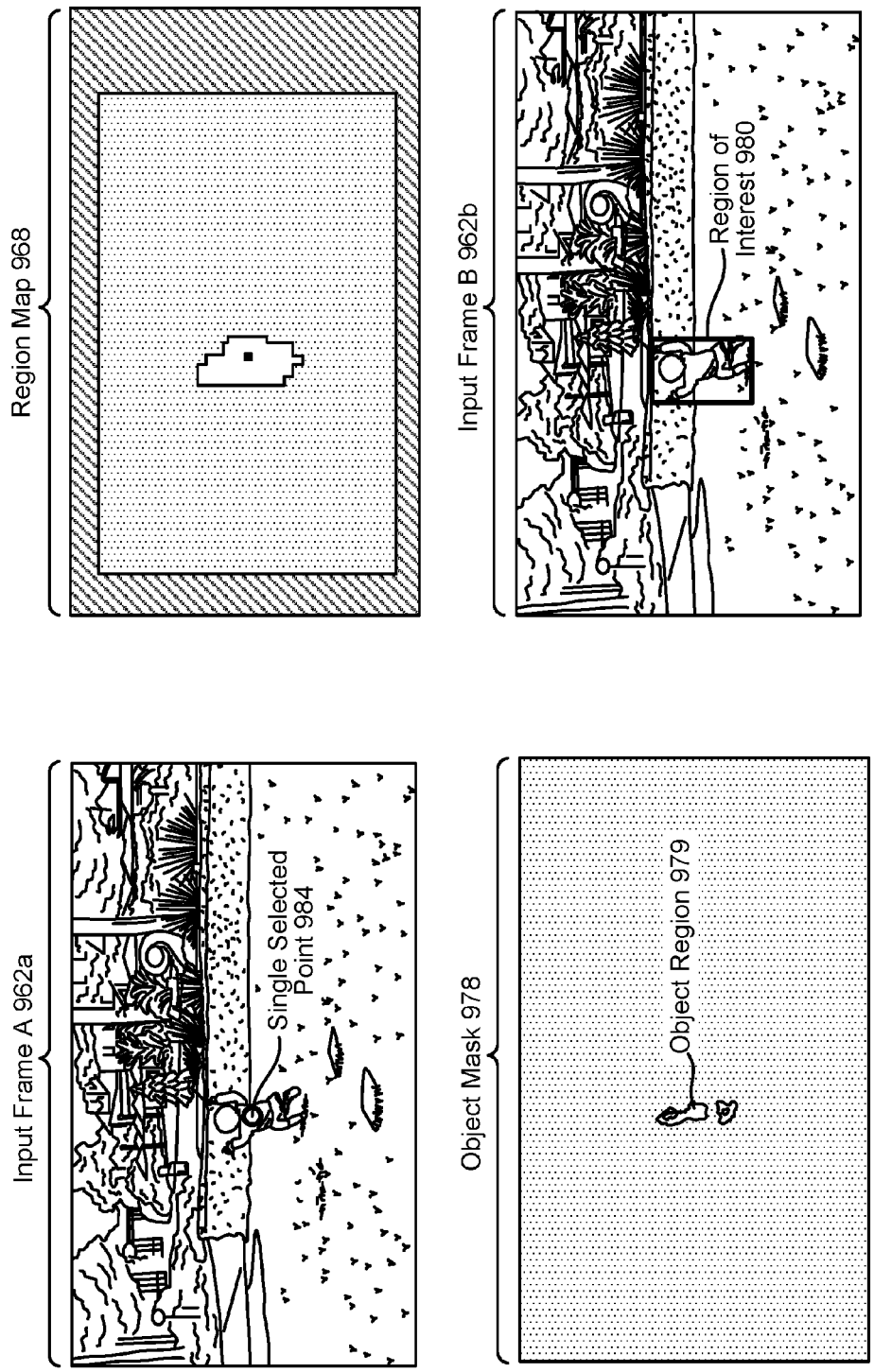
FIG. 9 illustrates an example of image segmentation based on the region map.

FIG. 9 illustrates an example of image segmentation based on the region map 968. In particular, FIG. 9 illustrates examples of an input frame 962, a region map 968, and an object mask 978. As described above, an electronic device 102 may obtain an image (e.g., input frame A 962a). The electronic device 102 may also obtain a single selected point 984. Based on the single selected point 984, the electronic device 102 may determine a region map 968 (e.g., a region, a target region, etc.). For example, the region map 968 illustrated in FIG. 9 may be an example of the region map 868 described in connection with FIG. 8.

In some configurations, the electronic device 102 may segment an image (e.g., input frame A 962a) based on the region of the region map 968 to produce an object mask 978. For example, the electronic device 102 may utilize scribble-based segmentation or another segmentation algorithm to produce the object mask 978 based on the region (e.g., target region). As illustrated in FIG. 9, the object mask 978 may include an object region 979. In general, an object region may include one or more sets (e.g., areas) of pixels that correspond to an object. The remainder of the object mask 978 may be a non-object region (e.g., non-object of interest region).

In some configurations, the electronic device 102 may determine a region of interest 980 (e.g., bounding region, bounding box, etc.) based on the object mask 978 (e.g., modified motion mask). For example, the region of interest 980 may be a shape that includes all or part of the object region 979. In some configurations, the region of interest 980 may have dimensions that tightly bound the object region 979. For example, the electronic device 102 may determine a rectangular shape with a width dimension that spans the largest width of the object region 979 and with a height dimension that spans that largest height of the object region 979. The region of interest 980 may be utilized in one or more applications (e.g., object tracking, image modification, object recognition, automatic zoom, etc.). For example, the systems and methods disclosed herein may provide improved object tracking, improved image modification, improved object recognition, and/or improved automatic zoom, since improved ROI accuracy may improve the performance (e.g., accuracy, reliability, etc.) of these applications.

Figure 10:
FIG. 10 illustrates an example of a comparison between an approach without motion-assisted region map generation and an approach with motion-assisted region map generation.

FIG. 10 illustrates an example of a comparison between an approach without motion-assisted region map generation and an approach with motion-assisted region map generation. Specifically, FIG. 10 illustrates input frame A 1082a and input frame B 1082b. In the example with input frame A 1082a, single selected point A 1084a was used to obtain a section map, though motion information was not taken into account (e.g., motion-assisted map refinement was not performed). The section map was utilized to generate a loose ROI 1086. As illustrated in the example with input frame A 1082a, the loose ROI 1086 does not tightly bound the object of interest (e.g., the foreground), since a large amount of background is also included in the loose ROI 1086.

In the example with input frame B 1082b, single selected point B 1084b was used to obtain a section map and motion information was taken into account (e.g., a motion mask was generated, motion-assisted map refinement was performed, etc.). The section map and the motion mask were utilized to generate a tight ROI 1088. As illustrated in the example with input frame B 1082b, the tight ROI 1088 tightly bounds the target object or object of interest (e.g., the foreground), since the tight ROI 1088 includes mostly the target object (e.g., foreground) and only a small amount of non-target content (e.g., background).

Figure 11:
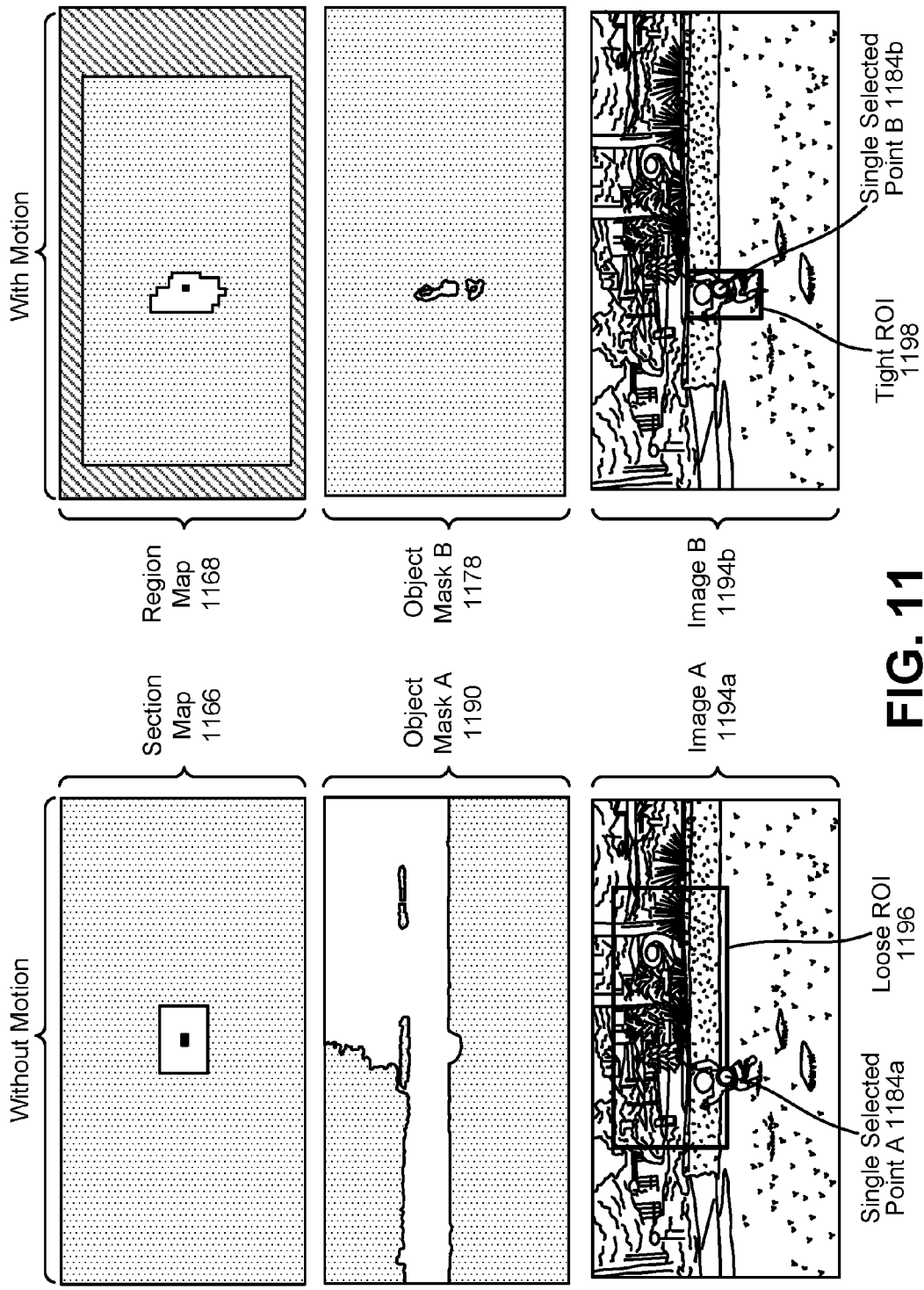
FIG. 11 illustrates another example of a comparison between an approach without motion-assisted region map generation and an approach with motion-assisted region map generation.

FIG. 11 illustrates another example of a comparison between an approach without motion-assisted region map generation and an approach with motion-assisted region map generation. Specifically, FIG. 11 illustrates image A 1194a and image B 1194b. In the example with image A 1194a, single selected point A 1184a was used to obtain a section map 1166, though motion information was not taken into account (e.g., motion-assisted map refinement was not performed). The section map 1166 was utilized to generate object mask A 1190 (e.g., to perform image segmentation to produce object mask A 1190). As illustrated in FIG. 11, object mask A 1190 covers a large area of non-target content that does not clearly indicate the target object or object of interest (e.g., foreground). Accordingly, utilizing object mask A 1190 may result in a loose ROI 1196. As illustrated in the example with image A 1194a, the loose ROI 1196 does not tightly bound the target object or object of interest (e.g., the foreground), since a large amount of background is also included in the loose ROI 1196.

In the example with image B 1194b, single selected point B 1184b was used to obtain a region map 1168 where motion information was taken into account (e.g., a section map and a motion mask were generated, motion-assisted map refinement was performed, etc.). The section map and the motion mask were utilized to generate the region map 1168. Image segmentation was then performed based on the region map 1168 to produce object mask B 1178. As illustrated in FIG. 11, object mask B 1178 accurately indicates the target object or object of interest. Object mask B 1178 was utilized to generate a tight ROI 1198. As illustrated in the example with image B 1194b, the tight ROI 1198 tightly bounds the target object or object of interest (e.g., the foreground), since the tight ROI 1198 includes mostly foreground and only a small amount of background.

Figure 12:
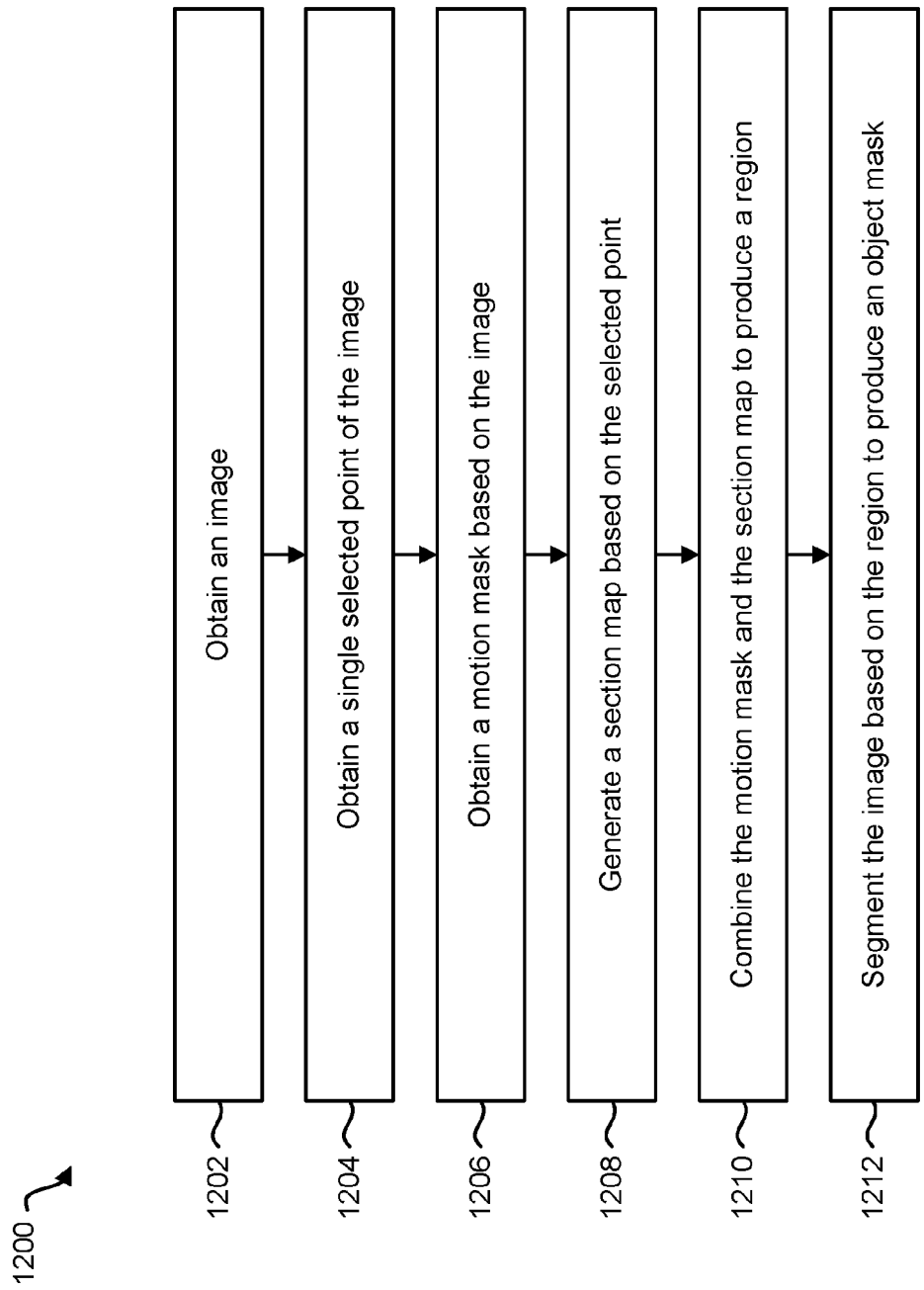
FIG. 12 is a flow diagram illustrating a more specific configuration of a method for determining a region of an image.

FIG. 12 is a flow diagram illustrating a more specific configuration of a method 1200 for determining a region of an image. The method 1200 may be performed by an electronic device (e.g., the electronic device 102 described in connection with FIG. 1.

The electronic device 102 may obtain 1202 an image. This may be accomplished as described in connection with one or more of FIGS. 1-4.

The electronic device 102 may obtain 1204 a single selected point of the image. This may be accomplished as described in connection with one or more of FIGS. 1-4 and 7-11.

The electronic device 102 may obtain 1206 a motion mask based on the image. This may be accomplished as described in connection with one or more of FIGS. 1-6, 8, and 11.

The electronic device 102 may generate 1208 a section map based on the selected point. This may be accomplished as described in connection with one or more of FIGS. 1-3, 7-8, and 11.

The electronic device 102 may combine 1210 the motion mask and the section map to produce a region (e.g., target region). This may be accomplished as described in connection with one or more of FIGS. 1-3, 8-9 and 11.

The electronic device 102 may segment 1212 the image based on the region (e.g., target region) to produce an object mask. This may be accomplished as described in connection with one or more of FIGS. 1-3, 9 and 11. In some configurations, the electronic device 102 may additionally or alternatively perform one or more operations. For example, the electronic device 102 may generate an ROI, perform object tracking, perform image modification, perform object recognition, perform object detection, and/or perform automatic zoom, etc., in some configurations.

Figure 13:
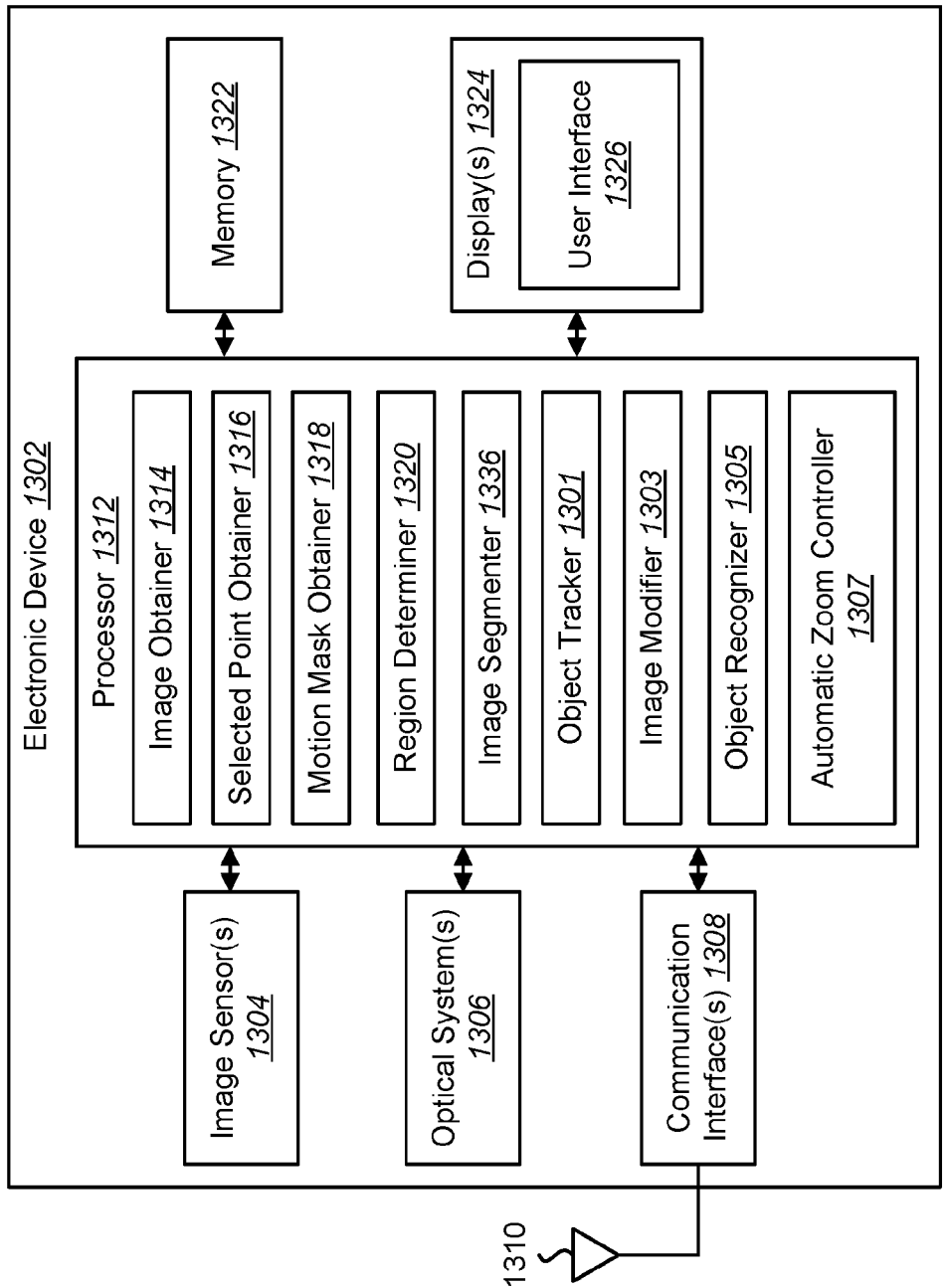
FIG. 13 is a block diagram illustrating a more specific example of an electronic device in which systems and methods for determining a region of an image may be implemented.

FIG. 13 is a block diagram illustrating a more specific example of an electronic device 1302 in which systems and methods for determining a region (e.g., target region) of an image may be implemented. The electronic device 1302 described in connection with FIG. 13 may be an example of the electronic device 102 described in connection with FIG. 1 and/or may be configured similarly to the electronic device 102 described in connection with FIG. 1 in some configurations. The electronic device 1302 may include one or more components or elements. One or more of the components or elements may be implemented in hardware (e.g., circuitry) or a combination of hardware and software (e.g., a processor with instructions). One or more of the components or elements described in connection with FIG. 13 may be examples of corresponding components or elements described in connection with FIG. 1.

In some configurations, the electronic device 1302 may perform one or more of the functions, procedures, methods, steps, etc., described in connection with one or more of FIGS. 1-12. Additionally or alternatively, the electronic device 1302 may include one or more of the structures described in connection with one or more of FIGS. 1-12.

In some configurations, the electronic device 1302 may include a processor 1312, a memory 1322, one or more displays 1324, one or more image sensors 1304, one or more optical systems 1306, one or more communication interfaces 1308, and/or one or more antennas 1310. The processor 1312 may be coupled to (e.g., in electronic communication with) the memory 1322, display 1324, image sensor(s) 1304, optical system(s) 1306, and/or communication interface 1308. The processor 1312, image sensor(s) 1304, optical system(s) 1306, communication interface(s) 1308, antenna(s) 1310, memory 1322, and/or display(s) 1324 may operate similarly to corresponding elements described in connection with FIG. 1 and/or may perform one or more of the functions described in connection with corresponding elements described in connection with FIG. 1. It should be noted that one or more of the elements of the electronic device 1302 described in connection with FIG. 13 (e.g., image sensor(s) 1304, optical system(s) 1306, communication interface 1308, display(s) 1324, etc.) may be optional and/or may not be included (e.g., implemented) in the electronic device 1302 in some configurations.

The processor 1312 may be configured to implement one or more of the methods disclosed herein. The processor 1312 may include and/or implement an image obtainer 1314, a selected point obtainer 1316, a motion mask obtainer 1318, a region determiner 1320, an image segmenter 1336, an object tracker 1301, an image modifier 1303, an object recognizer 1305, and/or an automatic zoom controller 1307 in some configurations. One or more of the image obtainer 1314, selected point obtainer 1316, motion mask obtainer 1318, and/or region determiner 1320 may be examples of corresponding components or elements described in connection with FIG. 1 and/or may perform one or more of the functions described in connection with corresponding elements described in connection with FIG. 1. It should be noted that one or more of the elements of the processor 1312 described in connection with FIG. 13 (e.g., image segmenter 1336, object tracker 1301, image modifier 1303, object recognizer 1305, and/or automatic zoom controller 1307, etc.) may be optional and/or may not be included (e.g., implemented) in the electronic device 1302 in some configurations.

The memory 1322 may store instructions and/or data. Examples of instructions and/or data that may be stored by the memory 1322 may include image data, image obtainer 1314 instructions, region determiner 1320 instructions, selected point obtainer 1316 instructions, motion mask obtainer 1318 instructions, image segmenter 1336 instructions, object tracker 1301 instructions, image modifier 1303 instructions, object recognizer 1305 instructions, and/or automatic zoom controller 1307 instructions, etc.

In some configurations, the electronic device 1302 may present a user interface 1326 on the display 1324. For example, the user interface 1326 may enable a user to interact with the electronic device 1302. In some configurations, the user interface 1326 may enable a user to input a selected point. For example, the user interface 1326 may receive a touch, a mouse click, a gesture and/or some other indication that selects a point and/or that indicates a selected point.

The processor 1312 may include and/or implement an image obtainer 1314. The image obtainer 1314 may be an example of the image obtainer 114 described in connection with FIG. 1. One or more images (e.g., image frames, video, burst shots, etc.) may be provided to the image obtainer 1314. This may be accomplished as described in connection with one or more of FIGS. 1-4. The images obtained from the cameras may be processed by the processor 1312 to perform region (e.g., target region) determination and/or object selection.

The processor 1312 may include and/or implement a selected point obtainer 1316. The selected point obtainer 1316 may be an example of the selected point obtainer 116 described in connection with FIG. 1. The selected point obtainer 1316 may obtain (e.g., determine and/or receive) one or more selected points of an image. This may be accomplished as described in connection with one or more of FIGS. 1-4 and 7-11. In some configurations, a user interface 1326 may receive an input (e.g., touch input, mouse click, gesture, etc.) that indicates a selected point. The selected point may correspond to an object in the image.

The processor 1312 may include and/or implement a motion mask obtainer 1318. The motion mask obtainer 1318 may be an example of the motion mask obtainer 118 described in connection with FIG. 1. The motion mask obtainer 1318 may obtain (e.g., determine and/or receive) a motion mask based on the image. This may be accomplished as described in connection with one or more of FIGS. 1-6, 8, and 11. The motion mask may include and/or indicate a local motion section and/or a global motion section of the image.

The processor 1312 may include and/or implement a region determiner 1320. The region determiner 1320 may be an example of the region determiner 120 described in connection with FIG. 1. The region determiner 1320 may determine a region (e.g., target region) in the image based on the selected point and the motion mask. This may be accomplished as described in connection with one or more of FIGS. 1-3, 7-9 and 11.

The processor 1312 may include and/or implement an image segmenter 1336. The image segmenter 1336 may be an example of the image segmenter (e.g., image segmenter 336) described in connection with one or more of FIGS. 1 and 3. The image segmenter 1336 may segment the image based on the region (e.g., target region) to produce an object mask. This may be accomplished as described in connection with one or more of FIGS. 1-3, 9 and 11. The object mask may include an object region and a non-object region. The object region may indicate the location of an object of interest in the image. Some configurations of the image segmenter 1336 may be based on scribble-based segmentation. Other segmentation approaches may be utilized.

In some configurations, the electronic device 1302 may generate a region of interest (ROI) (e.g., bounding box) based on the region (e.g., target region). For example, the electronic device 1302 may generate an ROI that includes all or a portion of the region. In some approaches, the electronic device 1302 may generate the ROI to tightly bound the object region (based on the image segmentation, for instance).

In some configurations, the processor 1312 may include and/or implement an object tracker 1301. The object tracker 1301 may track an object from image to image (e.g., frame-to-frame) based on the region (e.g., target region), the object region, and/or the ROI. For example, the object tracker 1301 may utilize the ROI that bounds the object of interest to track the object in a subsequent frame. For instance, the object tracker 1301 may utilize a motion-based approach, an object feature-based approach, or a combination thereof. For example, the object tracker 1301 may track motion of the image data within the ROI from frame to frame and/or may determine a location, size or frame of the target object based on movement of an electronic device 1302 (e.g., if the camera is moving) or movements of objects from frame to frame. Additionally or alternatively, the object tracker 1301 may determine one or more features (e.g., keypoints, feature vectors, etc.) of the object in the ROI. The object tracker 1301 may search a subsequent frame for the one or more features in order to track the object in the subsequent frame. In some implementations, the object tracker 1301 may utilize the ROI determined based on the region (e.g., based on the section map and the motion mask) in the current frame as a starting ROI for tracking thereafter. For example, the object tracker 1301 may generate one or more subsequent ROIs in one or more subsequent frames without repeating the region (e.g., target region) determination (e.g., motion mask and/or section map generation) in some configurations.

In some configurations, the processor 1312 may include and/or implement an image modifier 1303. The image modifier 1303 may modify an image based on the region (e.g., target region), the object region, and/or the ROI. For example, the image modifier 1303 may remove the object in the ROI by replacing the image data corresponding to the object (and/or the ROI) with substitute image data (e.g., copied image data from the image such as image data near the ROI and/or predetermined image data (e.g., image data for covering and/or censoring the object)). In another example, the image modifier 1303 may modify the appearance of the object. For instance, the image modifier 1303 may remove red eye corresponding to the object, may suppress image noise corresponding to the object, may enhance the appearance of the object (e.g., remove blemishes, saturate color, etc.), and/or may add an effect to the object (e.g., add the appearance of makeup, change colors, add a novelty effect, etc.). In another example, the image modifier 1303 may clone the object in the ROI by copying the image data from the ROI to another location in the image or a separate image. Other modifications are possible.

In some configurations, the processor 1312 may include and/or implement an object recognizer 1305. The object recognizer 1305 may perform object recognition based on the region (e.g., target region), the object region, and/or the ROI. For example, the object recognizer 1305 may compare the image data (e.g., object) in the ROI to a database of one or more known objects. If the object matches one or more of the known objects, the object recognizer 1305 may indicate a match and/or may perform another operation based on the match (e.g., retrieve information (e.g., name, identifier, contact information, etc.) corresponding to the object, tag the object in the image, etc.). In some configurations, the object recognizer 1305 may add recognition information to a database corresponding to the object in the ROI.

In some configurations, the processor 1312 may include and/or implement an automatic zoom controller 1307. The automatic zoom controller 1307 may perform automatic zoom based on the region (e.g., target region), the object region, and/or the ROI. For example, the automatic zoom controller 1307 may enlarge the appearance of an object in the ROI. For instance, the automatic zoom controller 1307 may control location, motion, motion response speed, size, and/or zoom level of a zoom region. A zoom region may be a region within the full field of view of the image sensor(s) 1304 and/or a remote camera. For example, the zoom region may be a sub-region of the full field of view (and may be relative to the full field of view, for example). The image content within the zoom region may be magnified (e.g., digitally scaled and/or enhanced, etc.) in order to enlarge the image content. In some configurations, performing automatic zoom may be based on the region (e.g., target region), the object region, and/or the ROI. For example, the zooming effect may be automatically changed based on the movement, location, and/or size of the object in the ROI. Additionally or alternatively, the automatic zoom controller 1307 may adjust a zoom level from frame-to-frame based on object motion. For example, the zoom (e.g., zoom factor, magnification, etc.) may be based on ROI size and a zoom region size. For example, the zoom level may be based on a size ratio of the ROI and the zoom region. For instance, the region determiner 1320 may increase the zoom in a case that the size ratio is less than a minimum zoom threshold. Additionally or alternatively, the region determiner 1320 may decrease the zoom in a case that the size ratio is greater than a maximum zoom threshold.

The processor 1312 may provide the zoom information (e.g., zoomed region information, the cropped zoom region, etc.). For example, the processor 1312 may provide the zoom region to the display(s) 1324 for presentation. Additionally or alternatively, the processor 1312 may send the zoom region to another device (via the communication interface 1308, for instance). In some configurations, the zoom region (e.g., the cropped zoom region) may be presented. The zoom region may occupy only a portion (e.g., picture-in-picture (PiP), picture and picture, etc.) of a view of the display 1324 in some approaches. For example, the zoom region may be presented on top of the full field of view. In other approaches, the zoom region may occupy the entire view. For example, the full field of view may not be shown when the zoom region is zoomed in.

It should be noted that one or more other modules and/or functions may be implemented in some configurations. For example, the processor 1312 may include an autofocus controller that may focus image content based on the region (e.g., target region), the object region, and/or the ROI. It should be noted that one or more of the elements or components of the electronic device 1302 may be combined and/or divided.

Figure 14:
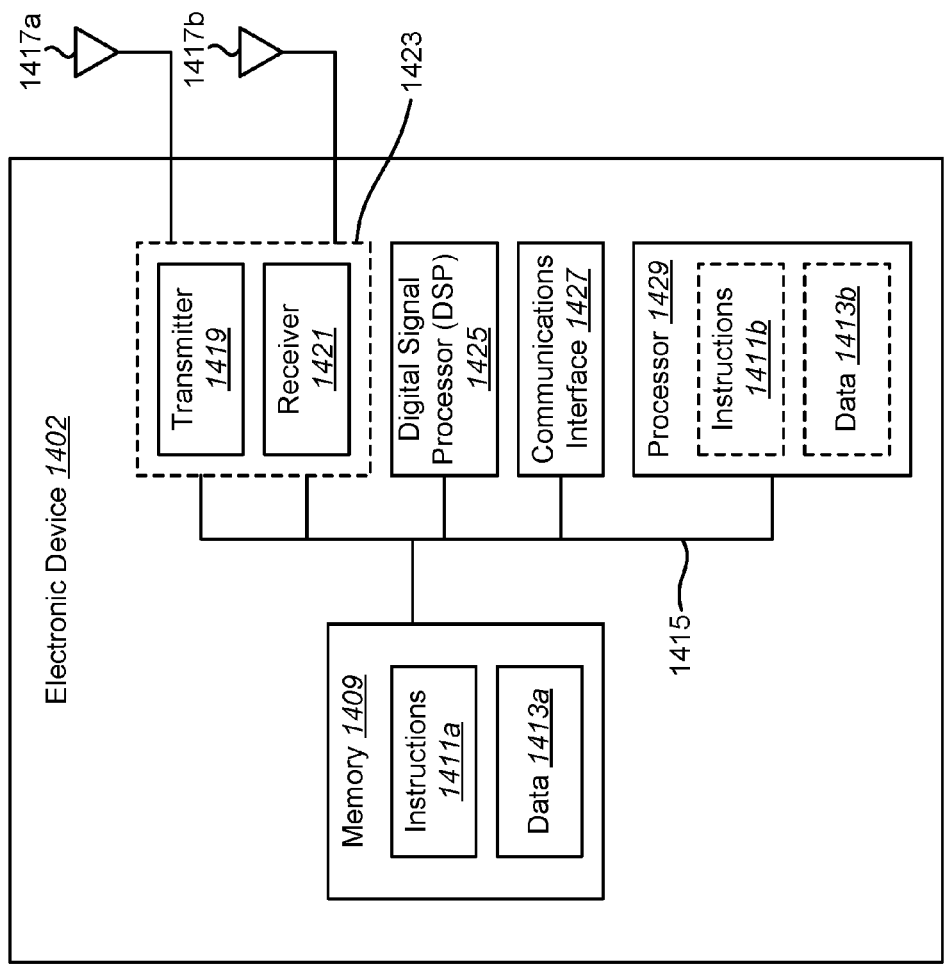
FIG. 14 illustrates certain components that may be included within an electronic device configured to implement various configurations of the systems and methods disclosed herein.

FIG. 14 illustrates certain components that may be included within an electronic device 1402 configured to implement various configurations of the systems and methods disclosed herein. The electronic device 1402 may be an access terminal, a mobile station, a user equipment (UE), a smartphone, a digital camera, a video camera, a tablet device, a laptop computer, etc. The electronic device 1402 may be implemented in accordance with one or more of the electronic devices 102, 1302 described herein. The electronic device 1402 includes a processor 1429. The processor 1429 may be a general purpose single- or multi-chip microprocessor (e.g., an ARM), a special purpose microprocessor (e.g., a digital signal processor (DSP)), a microcontroller, a programmable gate array, etc. The processor 1429 may be referred to as a central processing unit (CPU). Although just a single processor 1429 is shown in the electronic device 1402, in an alternative configuration, a combination of processors (e.g., an ARM and DSP) could be implemented.

The electronic device 1402 also includes memory 1409. The memory 1409 may be any electronic component capable of storing electronic information. The memory 1409 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1413a and instructions 1411a may be stored in the memory 1409. The instructions 1411a may be executable by the processor 1429 to implement one or more of the methods described herein. Executing the instructions 1411a may involve the use of the data 1413a that is stored in the memory 1409. When the processor 1429 executes the instructions 1411, various portions of the instructions 1411b may be loaded onto the processor 1429, and various pieces of data 1413b may be loaded onto the processor 1429.

The electronic device 1402 may also include a transmitter 1419 and a receiver 1421 to allow transmission and reception of signals to and from the electronic device 1402. The transmitter 1419 and receiver 1421 may be collectively referred to as a transceiver 1423. One or more antennas 1417a-b may be electrically coupled to the transceiver 1423. The electronic device 1402 may also include (not shown) multiple transmitters, multiple receivers, multiple transceivers and/or additional antennas.

The electronic device 1402 may include a digital signal processor (DSP) 1425. The electronic device 1402 may also include a communications interface 1427. The communications interface 1427 may allow and/or enable one or more kinds of input and/or output. For example, the communications interface 1427 may include one or more ports and/or communication devices for linking other devices to the electronic device 1402. In some configurations, the communications interface 1427 may include the transmitter 1419, the receiver 1421, or both (e.g., the transceiver 1423). Additionally or alternatively, the communications interface 1427 may include one or more other interfaces (e.g., touchscreen, keypad, keyboard, microphone, camera, etc.). For example, the communication interface 1427 may enable a user to interact with the electronic device 1402.

The various components of the electronic device 1402 may be coupled together by one or more buses, which may include a power bus, a control signal bus, a status signal bus, a data bus, etc. For the sake of clarity, the various buses are illustrated in FIG. 14 as a bus system 1415.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for determining a region of an image, comprising:
   presenting an image of a scene comprising one or more objects;
   receiving an input selecting a single point on the image corresponding to a target object;
   obtaining a motion mask based on the image, wherein the motion mask indicates a local motion section and a global motion section of the image;
   generating a section map based on the selected point, the section map comprising a target section corresponding to the selected point; and
   combining the target section and at least a portion of the local motion section to produce a region.

2. The method of claim 1, wherein the section map further comprises a probable target section, a probable non-target section, and a non-target section.

3. The method of claim 2, wherein the region further comprises at least a portion of the probable target section.

4. The method of claim 2, further comprising combining the global motion section, the probable non-target section, and the non-target section to produce a non-target region.

5. The method of claim 1, further comprising segmenting the image based on the region to produce an object mask.

6. The method of claim 1, further comprising fusing motion information and color information.

7. The method of claim 1, wherein obtaining the motion mask comprises:
   determining a set of local motion vectors within a region of interest between a previous frame and a current frame;
   determining a set of global motion vectors between the previous frame and the current frame; and
   calculating a global motion consistency measure based on the set of global motion vectors.

8. The method of claim 1, further comprising tracking the target object based on the region, wherein the region corresponds to the target object.

9. The method of claim 1, further comprising generating a region of interest (ROI) based on the region.

10. The method of claim 1, further comprising selecting the target object based on the region.

11. The method of claim 1, further comprising presenting an indication of the target object.

12. An electronic device for determining a region of an image, comprising:
    a processor configured to:
    present an image of a scene comprising one or more objects;
    receive an input selecting a single point on the image corresponding to a target object;
    obtain a motion mask based on the image, wherein the motion mask indicates a local motion section and a global motion section of the image;
    generate a section map based on the selected point, the section map comprising a target section corresponding to the selected point; and
    combine the target section and at least a portion of the local motion section to produce a region.

13. The electronic device of claim 12, wherein the section map further comprises a probable target section, a probable non-target section, and a non-target section.

14. The electronic device of claim 13, wherein the region further comprises at least a portion of the probable target section.

15. The electronic device of claim 13, wherein the processor is configured to combine the global motion section, the probable non-target section, and the non-target section to produce a non-target region.

16. The electronic device of claim 12, wherein the processor is configured to segment the image based on the region to produce an object mask.

17. The electronic device of claim 12, wherein the processor is configured to fuse motion information and color information.

18. The electronic device of claim 12, wherein the processor is configured to:
    determine a set of local motion vectors within a region of interest between a previous frame and a current frame;
    determine a set of global motion vectors between the previous frame and the current frame; and
    calculate a global motion consistency measure based on the set of global motion vectors.

19. An apparatus for determining a region of an image, comprising:
    means for presenting an image of a scene comprising one or more objects;
    means for receiving an input selecting a single point on the image corresponding to a target object;
    means for obtaining a motion mask based on the image, wherein the motion mask indicates a local motion section and a global motion section of the image;
    means for generating a section map based on the selected point, the section map comprising a target section corresponding to the selected point; and
    means for combining the target section and at least a portion of the local motion section to produce a region.

20. The apparatus of claim 19, wherein the section map further comprises a probable target section, a probable non-target section, and a non-target section.

21. The apparatus of claim 20, wherein the region further comprises at least a portion of the probable target section.

22. The apparatus of claim 20, further comprising means for combining the global motion section, the probable non-target section, and the non-target section to produce a non-target region.

23. The apparatus of claim 19, wherein the means for obtaining the motion mask comprises:
- means for determining a set of local motion vectors within a region of interest between a previous frame and a current frame;
- means for determining a set of global motion vectors between the previous frame and the current frame; and
- means for calculating a global motion consistency measure based on the set of global motion vectors.

24. A computer-program product for determining a region of an image, comprising a non-transitory computer-readable medium having instructions thereon, the instructions comprising:
- code for causing an electronic device to present an image of a scene comprising one or more objects;
- code for causing the electronic device to receive an input selecting a single point on the image corresponding to a target object;
- code for causing the electronic device to obtain a motion mask based on the image, wherein the motion mask indicates a local motion section and a global motion section of the image;
- code for causing the electronic device to generate a section map based on the selected point, the section map comprising a target section corresponding to the selected point; and
- code for causing the electronic device to combine the target section and at least a portion of the local motion section to produce a region.

25. The computer-program product of claim 24, wherein the section map further comprises a probable target section, a probable non-target section, and a non-target section.

26. The computer-program product of claim 25, wherein the region further comprises at least a portion of the probable target section.

27. The computer-program product of claim 25, further comprising code for causing the electronic device to combine the global motion section, the probable non-target section, and the non-target section to produce a non-target region.

28. The computer-program product of claim 24, wherein the code for causing the electronic device to obtain the motion mask comprises:
- code for causing the electronic device to determine a set of local motion vectors within a region of interest between a previous frame and a current frame;
- code for causing the electronic device to determine a set of global motion vectors between the previous frame and the current frame; and
- code for causing the electronic device to calculate a global motion consistency measure based on the set of global motion vectors.

* * * * *